United States Patent
Saito et al.

[11] Patent Number: 6,125,186
[45] Date of Patent: *Sep. 26, 2000

[54] ENCRYPTION COMMUNICATION SYSTEM USING AN AGENT AND A STORAGE MEDIUM FOR STORING THAT AGENT

[75] Inventors: Tamio Saito; Masanaga Tokuyo; Ichiro Iida; Yuji Takada, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/893,546

[22] Filed: Jul. 8, 1997

[30] Foreign Application Priority Data

Nov. 28, 1996 [JP] Japan .................. 8-317505

[51] Int. Cl.$^7$ ...................................... H04K 1/02
[52] U.S. Cl. .................. 380/287; 380/260; 380/274; 380/27; 713/200; 713/150
[58] Field of Search ................... 380/48, 27, 9, 380/23, 25, 49, 274, 260, 287; 713/200, 150

[56] References Cited

U.S. PATENT DOCUMENTS

| | | | |
|---|---|---|---|
| 4,484,025 | 11/1984 | Ostermann et al. | 380/21 |
| 4,677,670 | 6/1987 | Henderson | 380/23 |
| 4,885,778 | 12/1989 | Weiss | 380/48 |
| 4,984,271 | 1/1991 | Goto et al | 380/25 |
| 4,985,919 | 1/1991 | Naruse et al. | 380/18 |
| 5,349,643 | 9/1994 | Cox et al. . | |
| 5,355,413 | 10/1994 | Ohno | 380/24 |

FOREIGN PATENT DOCUMENTS

97/34426   9/1997   WIPO .

OTHER PUBLICATIONS

European Search Report for European Patent Application No. 97305086.7–2216 dated Nov. 11, 1999.

*Primary Examiner*—Tod R. Swann
*Assistant Examiner*—Paul E. Callahan
*Attorney, Agent, or Firm*—Staas & Halsey, LLP

[57] ABSTRACT

An agent is permanently resident in a server as software for the purpose of cryptographic processing. In addition, another agent that is described in mobile code and contains a program for the purpose of cryptographic processing is also stored in the server. When data that are to be sent and received between the server and a client are encrypted, the agent that is described in mobile code is sent from the server to the client. When the client receives data that were encrypted in the server, it reproduces those data by decryption using the received agent.

18 Claims, 29 Drawing Sheets

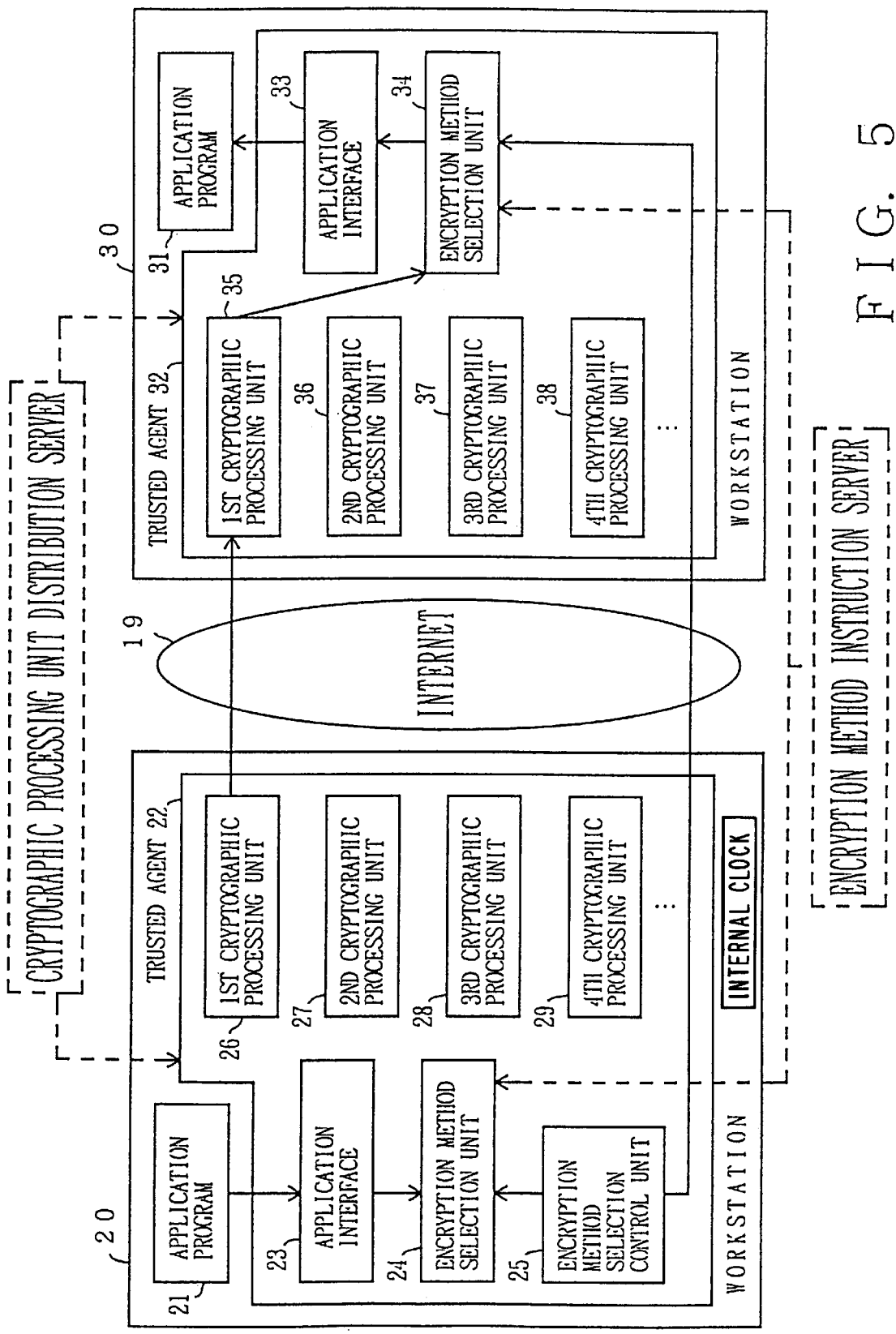

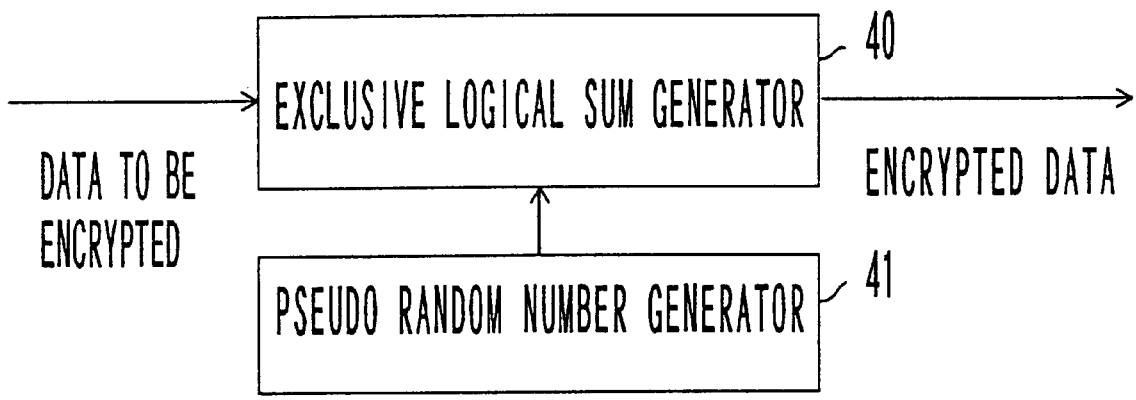
F I G. 7 A
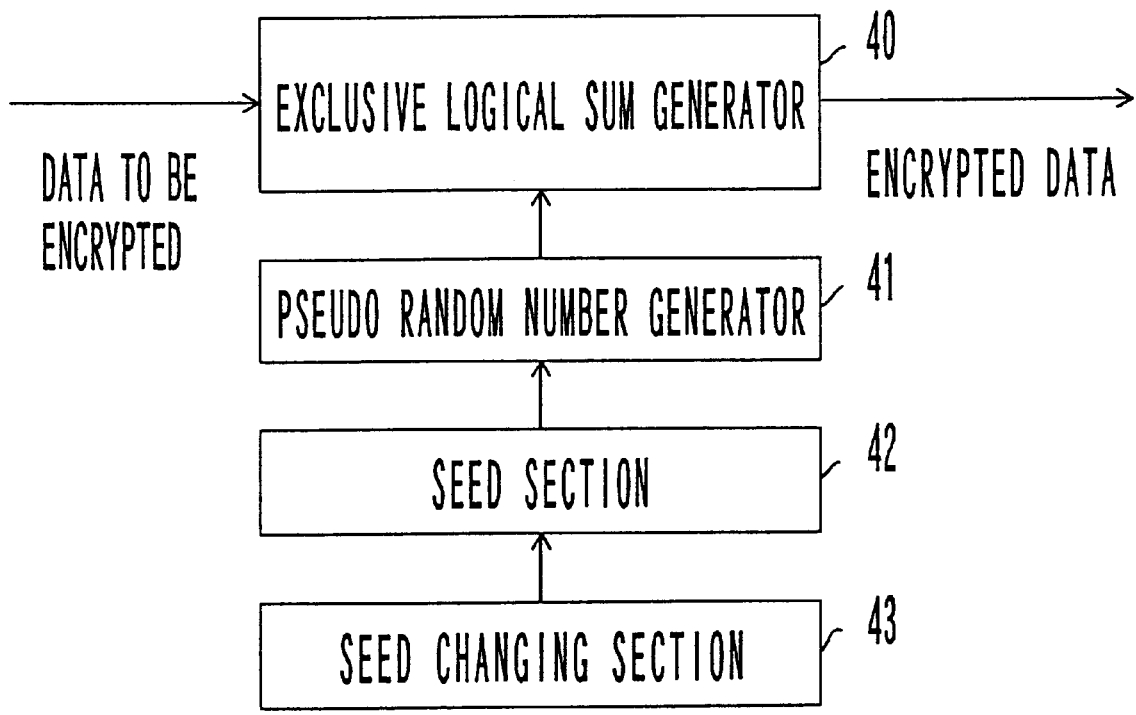
F I G. 7 B

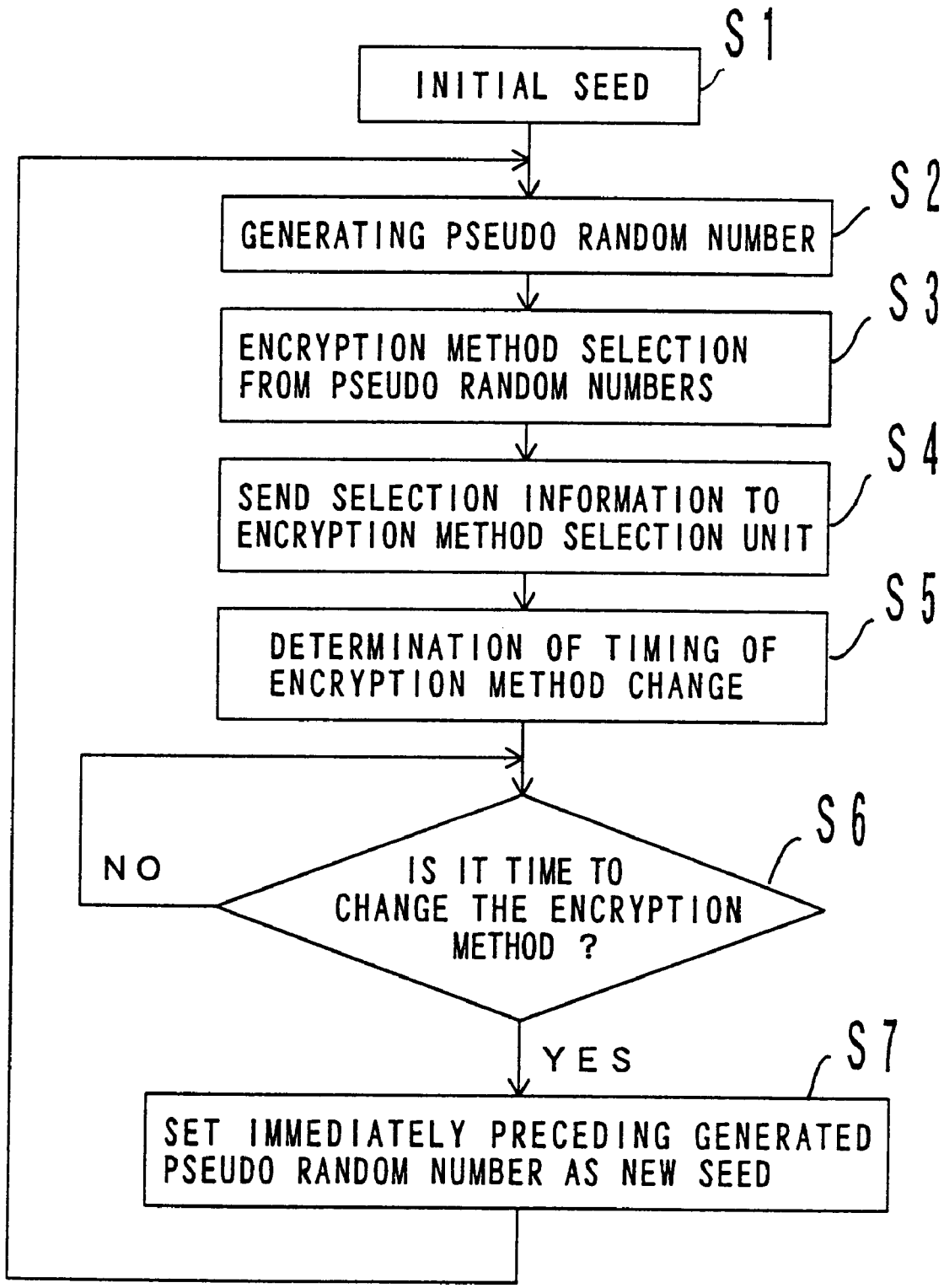
F I G. 1 1

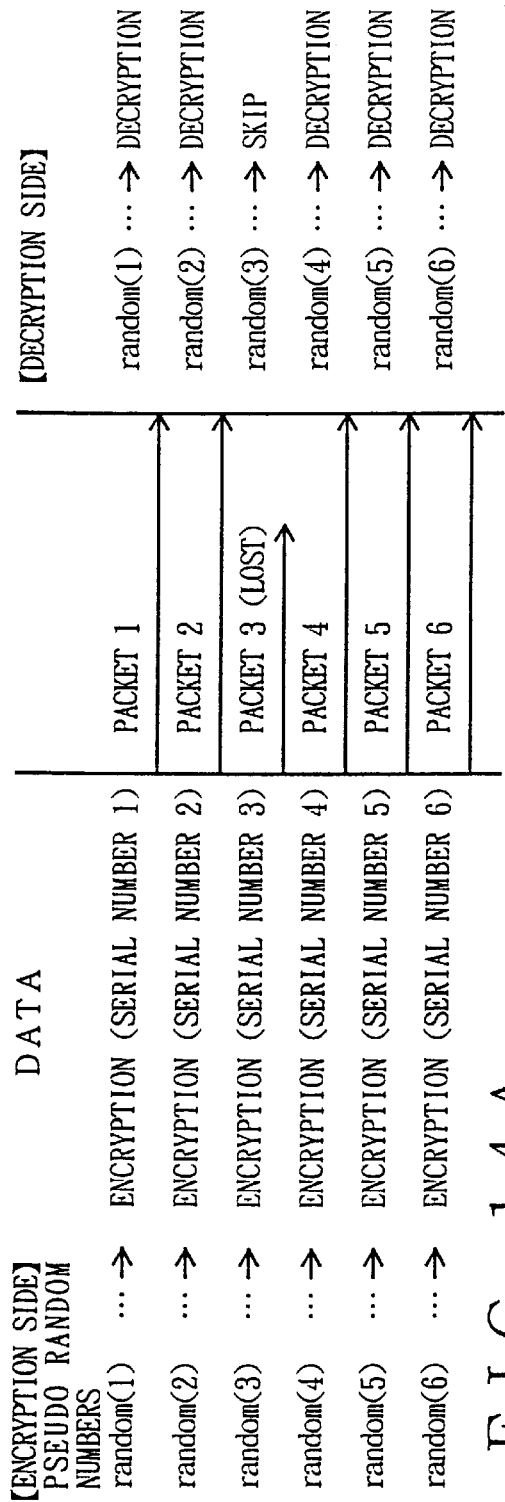
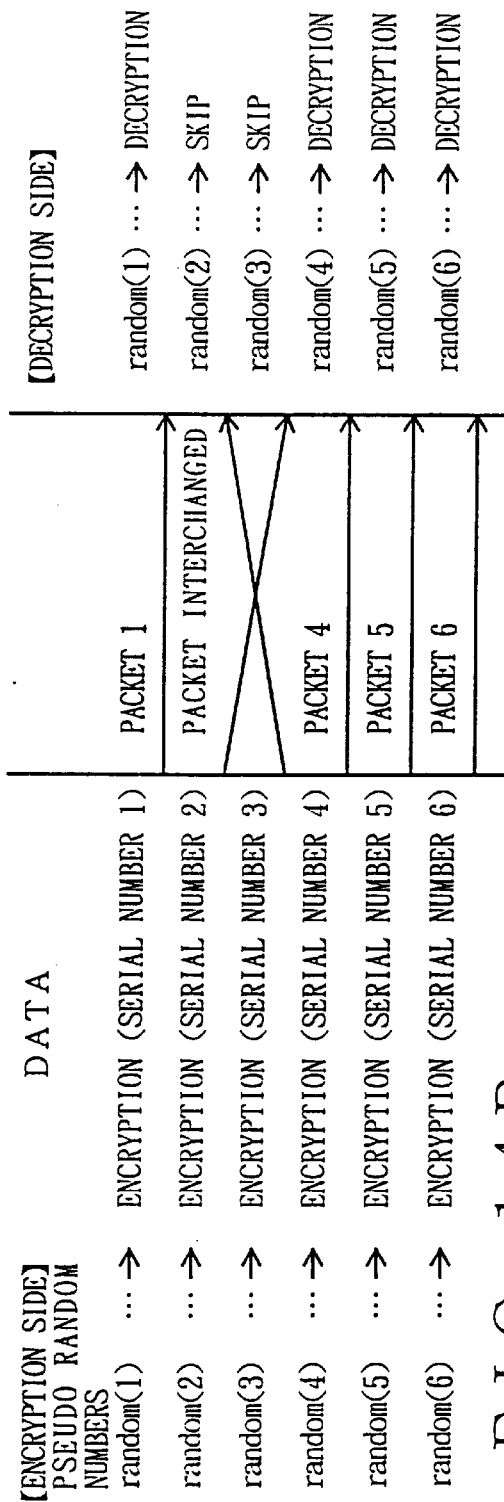
F I G. 14A
F I G. 14B

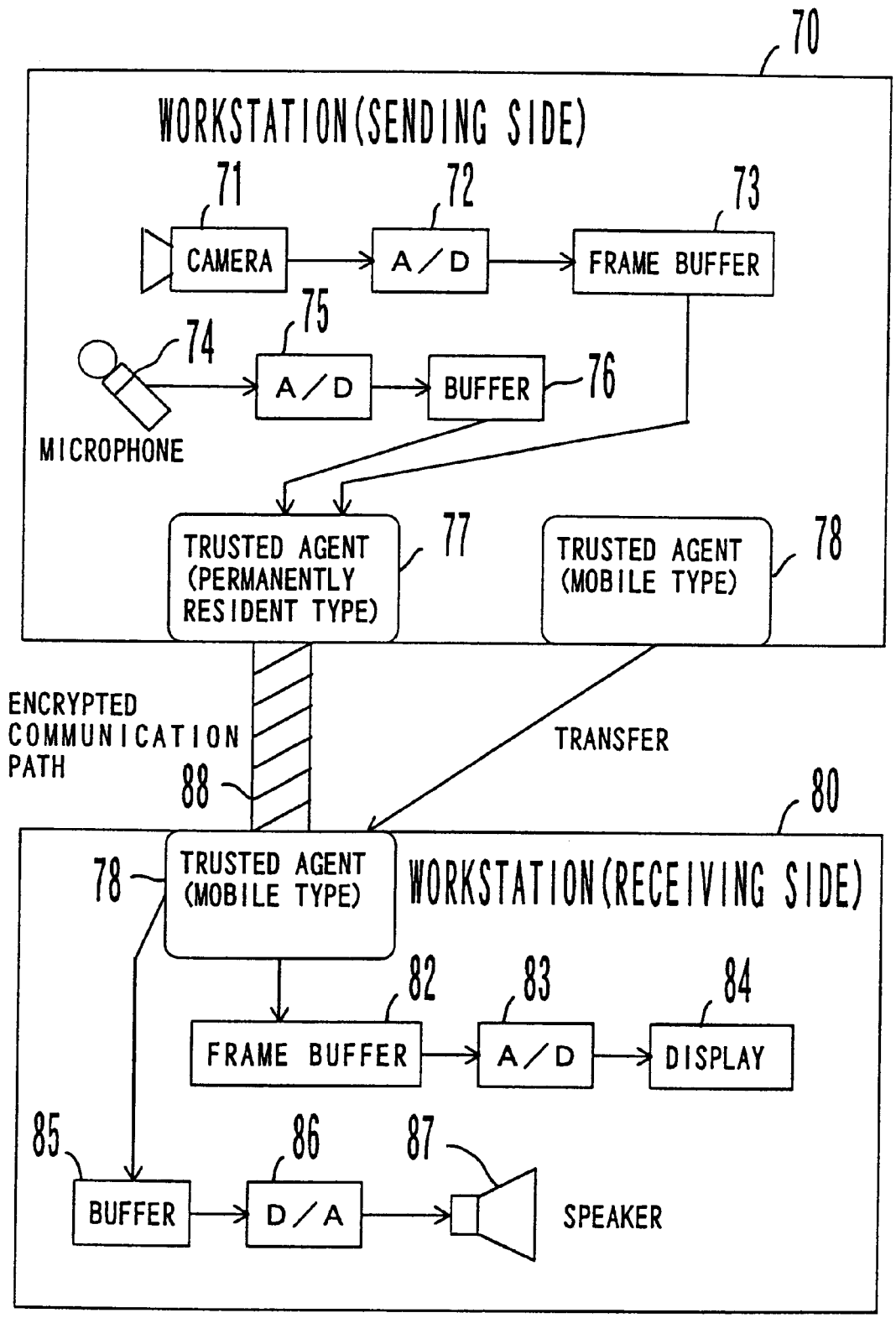
F I G. 2 0

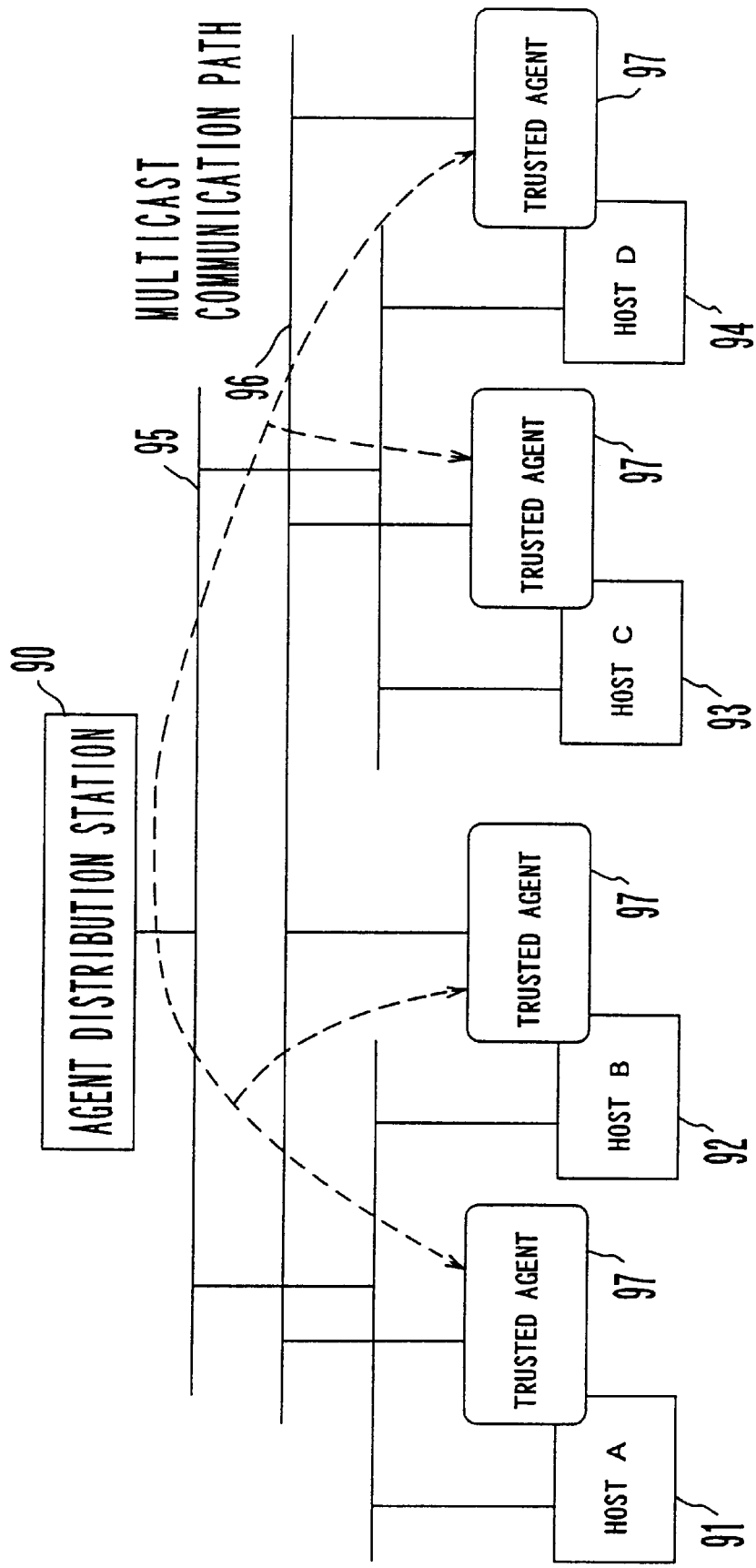
F I G. 21

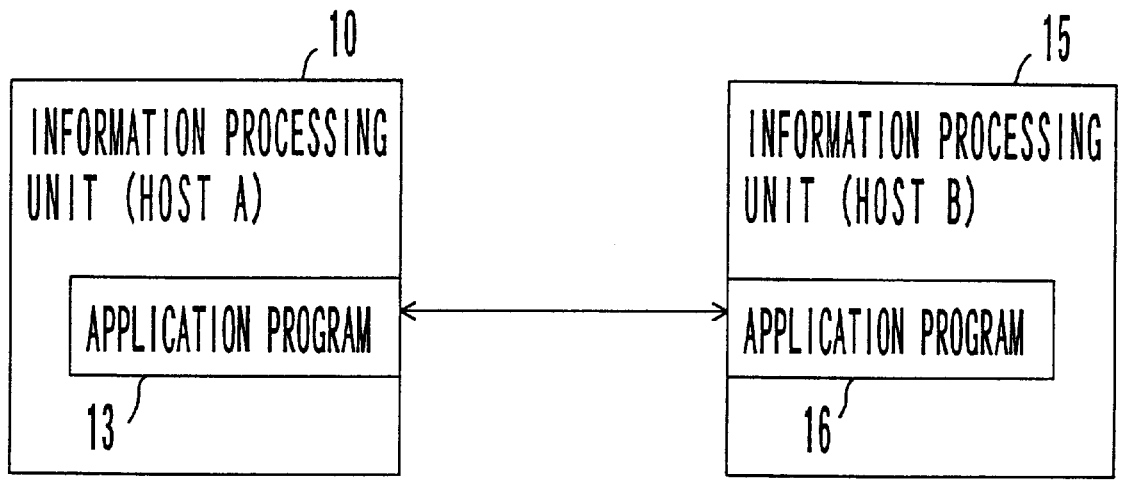
F I G. 2 2 A
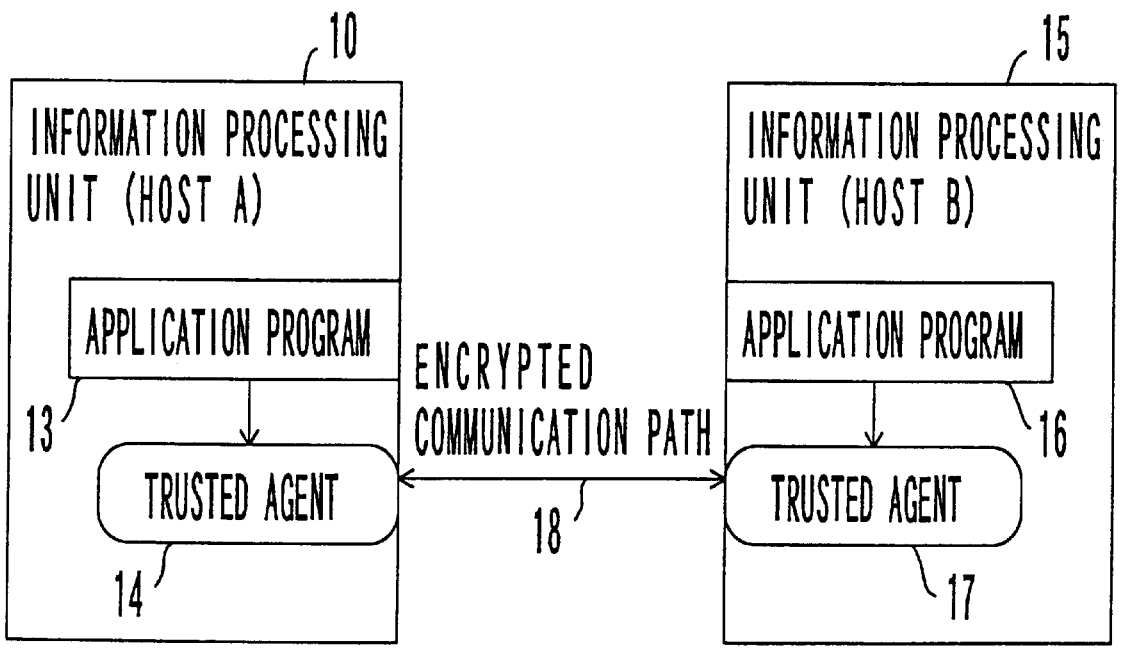
F I G. 2 2 B

FIG. 26

(H)
```
public void getimage(){
  try{
    int index = 0;
    int readnum;
    int maxread=2048;
    int zannsuu;
    int total = width*height*4;
    byte b[] = new byte[2048];
    int pix[] = new int[ width*height ];
    zannsuu = total ;
    while( zannsuu > 0 ) {
      if(zannsuu >= 2048){
        maxread = 2048;
      }else{
        maxread = zannsuu;
      }
```

(I)
```
      if ( ( readnum = sodatain.read( b,0,maxread ) ) == -1 ){
        break ;
      }
```

(J)
```
      rannsuu( b , readnum );
```

```
for(int k=0 ; k<(readnum/4) ; k++){
    pix[index]  = uint( b[4*k]   ) << 24;
    pix[index] |= uint( b[4*k+1] ) << 16;
    pix[index] |= uint( b[4*k+2] ) << 8;
    pix[index] |= uint( b[4*k+3] ) ;
    index++;
}
zannsuu -= readnum;
}
```
(K)

```
image = createImage( new MemoryImageSource(width, height, pix, 0, width) )
;
}catch (IOException e){
    System.err.println(" Cannot access. " + e.getMessage() );
    System.exit(0);
}
} int uint( byte a ){
    if ( a > 0 )
        return (int)a ;
    else
        return (int)( 256 + a ) ;
}
```
(L)

FIG. 27

```
(O)  public void run(){
        int i=0;
(P)     while(true){
            try{
                Thread.sleep(10);
            }catch(InterruptedException e){
                break;
            }
            imagefile = fixfile +"T"+ i + ".ppm" ;
(Q)         sendimagefile();
(R)         getimage();
(S)         repaint();
            i++;
            if(i==10){
                i=0;
            }
        }
        public void paint(Graphics g){
            g.drawImage( image , 10 ,10 , this );
        }
    } // ends
```

FIG. 29

ENCRYPTION COMMUNICATION SYSTEM USING AN AGENT AND A STORAGE MEDIUM FOR STORING THAT AGENT

BACKGROUND OF THE INVENTION

1. Field of the Invention

This invention is related to an encryption communication method to prevent the theft and interception of, and tampering with, information in communication between computers; in particular, it relates to a method of encryption using an agent.

2. Description of the Related Art

In recent years, with the explosive spread of the Internet and intranets, the importance of information security has been steadily increasing. Known methods of security in information communication include the method of encryption of information using encryption keys that are possessed in common by terminals, such as the DES (Data Encryption Standard), and a method of encryption such as RSA in which terminals exchange public keys and information is encrypted using their private keys. In addition, to increase the safety of encryption, there are known methods such as changing the encryption key and encryption method over time, as described, for example, in Tokkaihei (Japanese Patent Disclosure) 1-212041.

In a conventional ordinary encryption communication system, the encryption method is public information. For this reason, in order to obtain a strong cryptosystem, the key used in encryption must have a large number of bits. However, when the key used in encryption has a large number of bits, the time required for encryption and decryption processing inevitably becomes long. In particular, when encryption is done in real time applications (such as voice and images) the slowness of the processing in conventional methods such as DES and RSA is a problem.

When encryption is done by a method that involves changing the combination of the encryption key and the encryption method over time, it is necessary to preregister the encryption key and preinstall the encryption program in the terminals that will be used for such encryption communication. Consequently, every time new terminal facilities are added in a network it is necessary to register the encryption key and install the encryption program in those terminals.

SUMMARY OF THE INVENTION

A purpose of this invention is to provide a strong encryption method that has adequate processing speed so that in practice there is no problem in real time transfer of data.

Another purpose of this invention is to make it possible to conduct encrypted communication between terminals without having to preinstall the same encryption program in them.

An encryption communication method of the present invention is based on the system in which encrypted data are transmitted between a first terminal and a second terminal. The method includes the following steps.

A step for transmitting, from the first terminal in which a first agent is installed, the first agent including a program for cryptographic processing, a second agent having substantially the same function as the first agent to the second terminal.

A step for performing an encryption communication between the first agent and the second agent.

Another feature of the present invention is based on the system in which encrypted data are transmitted among a plurality of terminals. The method includes the following steps.

A step for distributing agents including a program for cryptographic processing from an agent distributing server to the plurality of terminals; and A step for performing an encryption communication between the distributed agents.

BRIEF DESCRIPTIONS OF THE DRAWINGS

FIG. 5 is a configuration diagram of the encrypted communication system of one embodiment of this invention.

FIGS. 7A and 7B are diagrams showing one example of the configuration of a cryptographic processing unit.

FIG. 11 is a flow chart explaining the action of the encryption method selection control unit.

FIGS. 14A and 14B are diagrams explaining a method of establishing cryptographic synchronization.

FIG. 20 is a configuration diagram for the case in which the encrypted communication of this invention is applied to an image transmission/voice transmission system.

FIG. 21 is a configuration diagram of the case in which the encrypted communication of this invention is applied to an electronic conference system.

FIGS. 22A and 22B are diagrams explaining the processing for changing the communication object of an application program when a trusted agent is used.

FIGS. 23 through 29 are figures showing an example of an agent program used to transmit encrypted images described in mobile code.

DETAILED DESCRIPTION OF THE INVENTION

In the encrypted communication system of one embodiment of this invention, first, an agent for the purpose of encryption processing is installed in the sending terminal. Before transferring data, the sending terminal sends an agent having the same function as the installed agent to the receiving terminal. The agent that is sent to the receiving terminal is described in mobile code. When data are transferred, the data are encrypted using that agent in the sending terminal, and decrypted in the receiving terminal using the agent that was sent from the sending terminal.

Thus, in this configuration, it is possible to conduct encrypted communication even with a terminal that does not have a program for encryption processing. At this time, the encryption and decryption processing are executed by the agent, so it is not necessary for the user to be concerned with the encryption method used for that encrypted communication. Moreover, the encryption and decryption processing are performed by agents having the same functions in both the sending terminal and the receiving terminal, so that the cipher text can be reliably decrypted in the receiving terminal. The encryption method can, if desired, be confidential. The security of the encryption can be increased by changing the key needed for encryption synchronously in accordance with rules agreed upon in advance between the agents. Therefore, an encryption method with a small overhead can be selected to reduce processing time.

Figure 1:
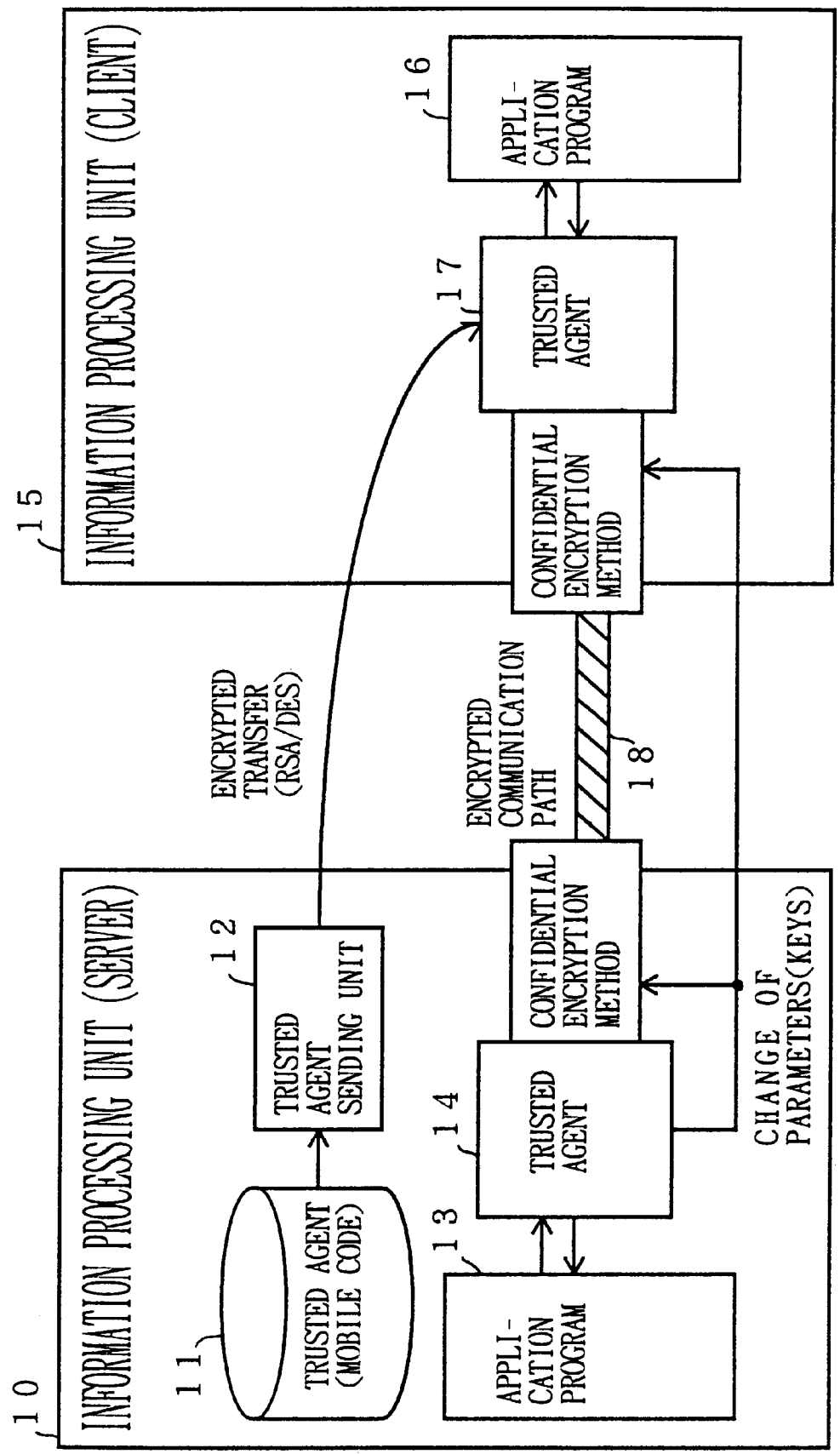
FIG. 1 is a diagram explaining an outline of this invention.

Embodiments of this invention will be described below with reference to the drawings. FIG. 1 is a diagram that explains an outline of this invention. This diagram shows an example in which information is transferred in encrypted form between a server 10 and a client 15. The server 10 and the client 15 are both computers.

The trusted agent 11 has a program for the purpose of encrypting data, and is described in mobile code. The trusted agent sending unit 12 sends the trusted agent 11 to the client 15. The application program 13 performs processing that accompanies sending data to and receiving data from the client 15. Applications which are envisioned in this embodiment include telephone, television conferences, video transmission, etc., all of which require real-time processing, but the possible applications are not limited to these. The trusted agent 14 is an encrypted program that has the same function as the trusted agent 11; it resides permanently in the server 10.

The application program 16 is basically the same as the application 13. The trusted agent 17 is the trusted agent 11 that was transferred from the server 10. The encrypted communication path 18 is a path established between the trusted agent 14 and the trusted agent 17.

Figure 2:
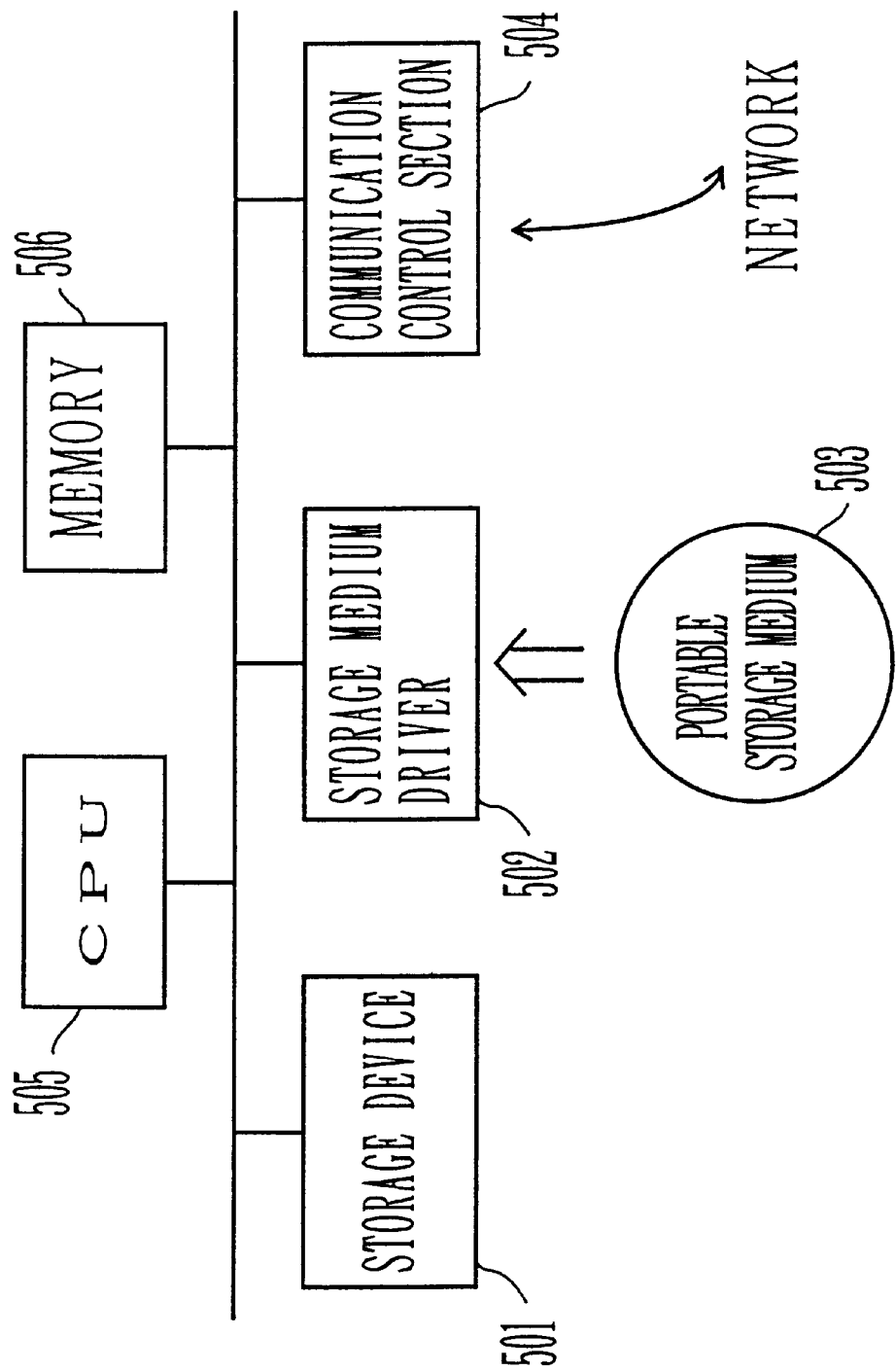
FIG. 2 is a configuration diagram of the server and the client.

FIG. 2 is a configuration diagram of the server 10 and the client 15. The storage device 501 consists of a semiconductor memory, a magnetic recording medium or an optical recording medium and so on, and stores programs, data, etc. The storage device 501 can be permanently installed in the server 10 or the client 15, or it can be removable.

The storage medium driver 502 is a device that reads out data stored in the portable storage medium 503 (including a semiconductor memory, magnetic disc, optical disc, magneto-optical disc, etc.), or writes data into the portable storage medium 503. The communication control unit 504 is a unit that controls the sending of data to and receiving of data from a network.

The CPU 505 loads programs from the storage device 501 or the portable storage medium 503 into the memory 506 and executes them. Note that programs and data stored in the storage medium 501 may have been written in from the portable storage medium 503, or may be received from another machine on a network via a communication line. The configuration may also be such that the CPU 505 can use programs and data stored in another storage device on a network via a communication line.

The trusted agents 11 and 14 are prestored in the storage device 501 in the server 10. The trusted agents 11 and 14 may be installed from the portable storage medium 503 into the storage device 501, or may be installed from another device on a network into the storage device 501. The trusted agent 14 is loaded into the memory 506 when an encrypted communication is started.

In the client 15, the trusted agent 17 is received via the communication control section 504 and loaded into the memory 506.

The action of the cryptosystem shown in FIG. 1 is as follows. First, before the data communication, the trusted agent sending unit 12 is started up and the trusted agent 11 is sent from the server 10 to the client 15. At this time, the trusted agent 11 is encrypted by a method such as RSA or RSA+DES and transferred.

The processing speeds of RSA, DES, etc. are slow, so they are not the best encryption methods to use for encrypting data that require real time processing such as audio data and video data, but when encrypting a trusted agent, the encryption processing and the decryption processing each only have to be done once, and the amount of data is much less than in the cases of audio data and video data, so that even in the cases of RSA and DES the processing speed does not become a problem.

Next, the trusted agent 14 of the server 10 and the trusted agent 17 of the client 15 establish the encrypted communication path 18. The processing by which the trusted agent 11 is transferred from the server 10 to the client 15, and the processing by which the encrypted communication path 18 between the trusted agent 14 and the trusted agent 17 is established, will be explained later.

The trusted agents 14 and 17 are linked to the application programs 13 and 16, respectively; they encrypt data so that the data cannot be stolen or tampered with, then send and receive the data to/from each other. The encryption between the trusted agent 14 and the trusted agent 17 follows the method described in the programs included in the trusted agents 14 and 17. The trusted agents 14 and 17 can synchronously change the key (a confidential key) necessary for encryption in accordance with a predetermined rule. This increases the strength of the encryption.

Figure 3A:
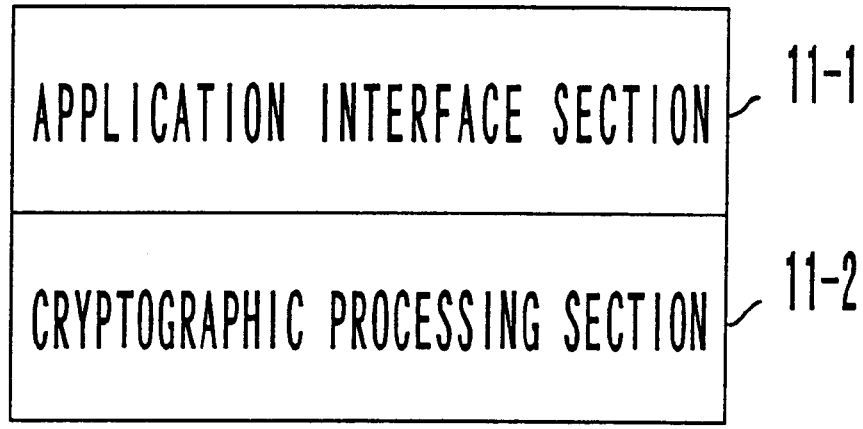
FIGS. 3A and 3B are configuration diagrams of a trusted agent described in mobile code.

FIG. 3 is a configuration diagram of the trusted agent 11 described in mobile code. As shown in FIG. 3A, the trusted agent 11 consists of an application interface section 11-1 and a cryptographic processing section 11-2. The application interface section 11-1 has the role of exchanging signals between an ordinary application program (here, application 16) and the cryptographic processing section 11-2; the cryptographic processing section 11-2 encrypts and decrypts signals to/from the application interface section 11-1. Another function that the application interface section 11-1 has is to absorb differences due to different operating systems when the API depends on the operating system.

Figure 3B:
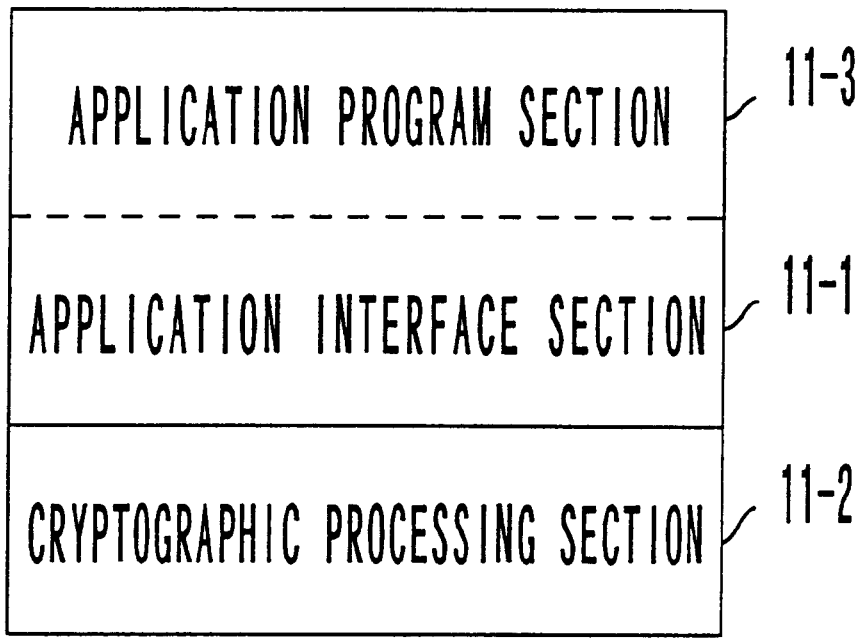

In FIG. 3B, the trusted agent 11 has an application program section 11-3. In this case, the application program stored in the trusted agent 11 is described in mobile code, and the application program section 11-3 is transmitted together with the application interface section 11-1 and the cryptographic processing section 11-2.

Figure 4A:
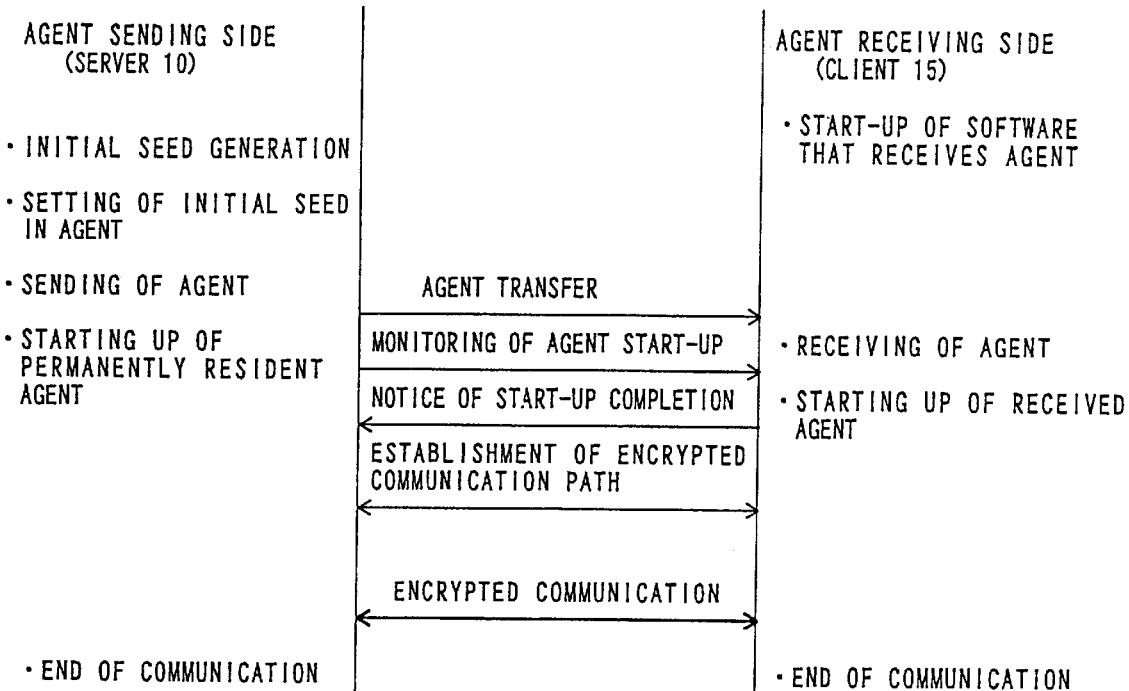
FIGS. 4A and 4B are sequence diagrams explaining the processing involved in sending a trusted agent and establishing an encrypted communication path.

FIG. 4A is a sequence diagram that explains the processing by which a trusted agent is sent and an encrypted communication path is established. Here it is assumed that the server 10 is the terminal that sends the trusted agent, and the client 15 is the terminal that receives the trusted agent. It is further assumed that the encryption method uses pseudo random numbers. As will be explained in detail later, the pseudo random numbers are generated based on an "initial seed".

When encrypted communication is started, first an initial seed is generated in the server 10. The initial seed is, for example, generated based on the time. Next, that initial seed is set in the trusted agents 11 and 14. Then the trusted agent 11 in which the initial seed has been set is sent to the client 15. As discussed above, the trusted agent 11 is transferred after having been encrypted by the RSA or DES method. Then the server 10 starts the trusted agent 14.

It is assumed that in the client 15, a program to receive the agent has been started up. When the client 15 receives the trusted agent 11, that trusted agent 11 is loaded into memory and started up as the trusted agent 17.

The trusted agents 14 and 17 establish a encrypted communication path; after that, cipher text is sent and received via that encrypted communication path.

Figure 4B:
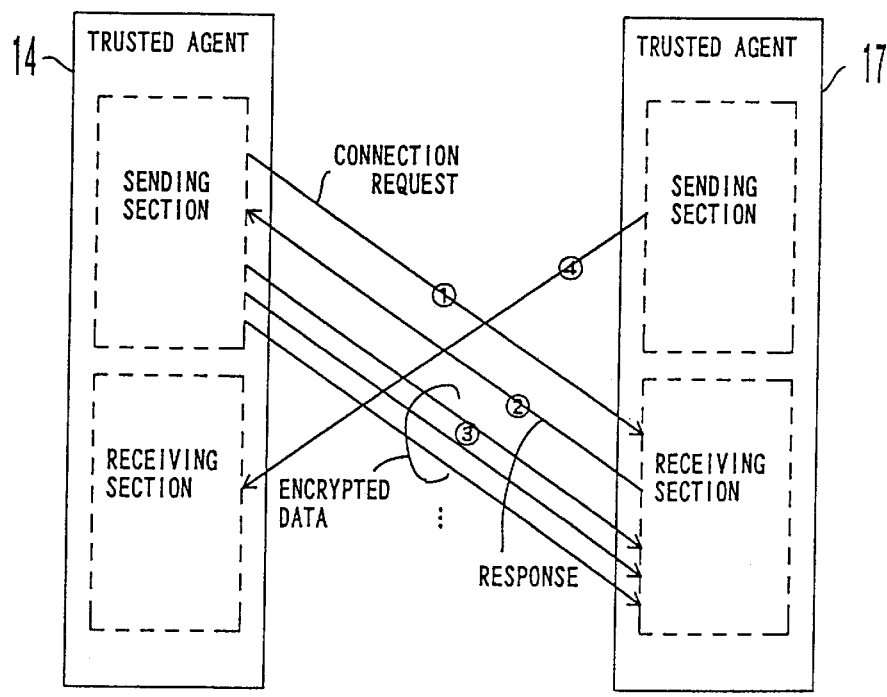

FIG. 4B is a diagram that explains the procedure by which an encrypted communication path between trusted agents is established. Here it is assumed that the trusted agent 14 has already been started up. The cryptographic processing sections of the trusted agents 14 and 17 each consist of a sending section and a receiving section. The sending section encrypts data from an application program and performs send processing; the receiving section converts encrypted data to plain text or appropriate application data and performs processing to transfer the data to an application program. The sending section and the receiving section are realized by, for example, threads.

First, the sending section of the trusted agent 14 sends a request for connection to the receiving section of the trusted agent 17. If, for example, the transmission path is an ethernet, this connection request is transferred by a TCP packet. Since, at this time, the connection request will be refused if the trusted agent 17 has not been started up, in this case the sending section of the trusted agent 14 repeatedly issues the connection request until a response is received from the receiving section of the trusted agent 17.

When the receiving section of the trusted agent 17 sends a response message in response to the connection request and the receiving section of the trusted agent 14 receives that message, a path is established between the sending section of the trusted agent 14 and the receiving section of the trusted agent 17. The procedure for establishing a path between the sending section of the trusted agent 17 and the receiving section of the trusted agent 14 is similar.

After that, the sending section of the trusted agent 14 encrypts data from the application program 13 and then sends the encrypted data to the trusted agent 17 via the path that has been established. The receiving section of the trusted agent 17 decrypts the received cipher text or encrypted data and transfers the resulting plain text or appropriate application data to the application program 16. The procedure for sending encrypted data in the opposite direction is similar. The encrypted data are, for example, stored in a UDP packet and then transferred.

FIG. 5 is a configuration diagram of the encrypted communication system of one embodiment of this invention. The workstations 20 and 30 correspond to the server 10 and the client 15, respectively, in FIG. 1. The application programs 21 and 31 correspond to the application programs 13 and 16, respectively, in FIG. 1. The trusted agents 22 and 32 correspond to the trusted agents 14 and 17 in FIG. 1, respectively. The workstation 20 and the workstation 30 are connected to each other via the Internet 19.

The trusted agent 22 has the cryptographic processing units 26 to 29. Each of the cryptographic processing units 26 to 29 encrypts data by a different method from the others. The encryption method selection unit 24 selects one of the cryptographic processing units 26 to 29 in accordance with an instruction from the encryption method selection control unit 25, and transfers data received via the application interface section 23 to the selected cryptographic processing unit. The encryption method selection control unit 25 generates and outputs an instruction signal for the purpose of selecting one from among the cryptographic processing units 26 to 29 in accordance with a specified algorithm. The method by which this instruction signal is generated will be described below. The application interface section 23 is basically the same as the application interface section 11-1 shown in FIG. 3A and FIG. 3B.

The trusted agent 32 has been transferred from the workstation 20. The application interface unit 33, the encryption method selection unit 34 and the cryptographic processing units 35 to 38 are basically the same, respectively, as the application interface unit 23, the encryption method selection unit 24 and the cryptographic processing units 26 to 29 which make up the trusted agent 22. The trusted agent 32 does not have a unit corresponding to the encryption method selection control unit 25; the encryption method selection unit 34 selects one of the cryptographic processing units 35 to 38 in accordance with an instruction signal generated by the encryption method selection control unit 25.

The action of the encrypted communication system shown in FIG. 5 is as follows. First, the trusted agent 32 that is described in mobile code is encrypted and transferred from the workstation 20 to the workstation 30.

Next, the encryption method that is necessary for the encrypted communication is determined in the encryption method selection control unit 25. The encryption method selection control unit 25 transfers information instructing which encryption method is to be used to the encryption method selection unit 24, and to the encryption method selection unit 34 of the workstation 30. This secures the encrypted communication path.

When, for example, the encryption method selection control unit 25 selects the first encryption method, then, as shown in FIG. 5, in the workstation 20 data are encrypted using the 1st cryptographic processing unit 26, and in the workstation 30 the cipher text or encrypted data is decrypted using the 1st cryptographic processing unit 35.

Communication data from the application program 21 are encrypted in the cryptographic processing unit selected by the encryption method selection unit 24 via the application interface unit 23. The example shown in FIG. 5 shows the case in which the 1st cryptographic processing unit 26 has been selected.

The encrypted data are sent to the workstation 30 via the Internet 19. Data (cipher text or encrypted data) received by the workstation 30 are decrypted in the cryptographic processing unit selected by the encryption method selection unit 34 (in this example, the 1st cryptographic processing unit 35), and transferred to the application program 31 in the workstation 30 via the application interface unit 33.

Data transmission from the application program 31 in the workstation 30 to the application program 21 in the workstation 20 is carried out by a similar encryption procedure.

The encryption method selection control unit 25 selects new encryption methods at regular or irregular intervals, and posts the selection results to the encryption method selection unit 24 of the workstation 20 and the encryption method selection unit 34 of the workstation 30. In this kind of configuration, the encryption method changes with time, making it difficult to decipher the encrypted data.

In the embodiment described above, the encryption method selection control unit 25 is provided in the workstation 20, but it is also possible to, for example, install an encryption method instruction server on the network, and to have the trusted agents switch their encryption methods based on instructions from that encryption method instruction server.

Also, in the embodiment described above, the cryptographic processing units are within the trusted agents, but it is also possible to install a cryptographic processing unit distribution server that distributes programs for the purpose of cryptographic processing described in mobile code on a network, and to have programs for the purpose of cryptographic processing distributed from the cryptographic processing unit distribution server to the trusted agents.

Figure 6:
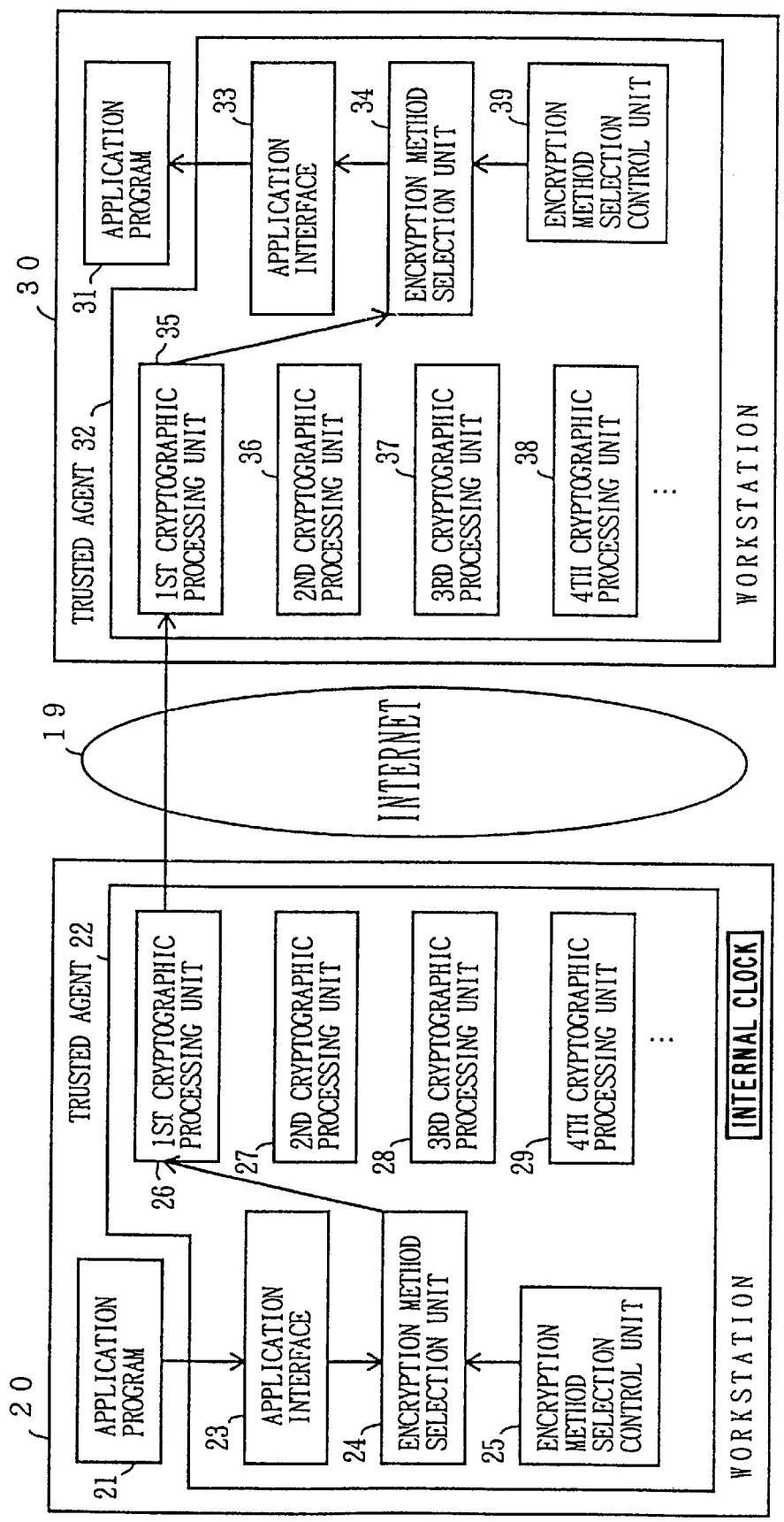
FIG. 6 is a configuration diagram of the encrypted communication system of another embodiment of this invention.

FIG. 6 is a configuration diagram of the encrypted communication system of another embodiment of this invention. In FIG. 6, the previous explanations apply without change to components to which the same symbols that were used in FIG. 5.

In the system shown in FIG. 6, the encryption method selection control unit 39 is provided in the trusted agent 32. The encryption method selection control unit 39 is the same as the encryption method selection control unit 25 within the trusted agent 22. Consequently, the trusted agent 32 can select the same encryption method by itself as the encryption method selected by the trusted agent 22 without receiving an instruction for the purpose of encryption method selection from the trusted agent 22.

Now let us explain the action of the encrypted communication system shown in FIG. 6. First, the trusted agent 32 is transferred from the workstation 20 to the workstation 30. This processing is as explained with reference to FIG. 5.

The encryption method selection control unit 25 in the workstation 20 and the encryption method selection control unit 39 in the workstation 30 determine their respective encryption methods independently of one another, and post those respective encryption methods that have been determined to the encryption method selection unit 24 of the workstation 20 and the encryption method selection unit 34 of the workstation 30, respectively. Here, the encryption method selection control units 25 and 39 have synchronization functions in the encryption method selection, so that the same encryption method is selected by the encryption method selection control units 25 and 34.

Let us now simply explain what is meant by "synchronization functions in the encryption method selection". The encryption method selection control units 25 and 39 respectively output results obtained in accordance with given initial conditions. The initial conditions given to the encryption method selection control unit 39 are set in the workstation 20. These initial conditions are the same as those given to the encryption method selection control unit 25. In FIG. 4, which was discussed above, the same initial seeds were set in 2 trusted agents as initial conditions. Here, the encryption method selection control units 25 and 39 have the same functions as one another, so that when the encryption method selection control units 25 and 39 are given the same initial conditions, they will generate the same results. Consequently, the encryption method selection control units 25 and 39 act independently of each other, but output the same values as signals that indicate the encryption method to be used. This is called synchronization in the selection of the encryption method.

By means of the synchronization function, the same encryption method is always selected in the workstation 20 and the workstation 30, without the sending and receiving of information between them. This secures an encrypted communication path.

The action by which data are encrypted and sent and received between the application programs 21 and 31 is as explained in FIG. 5. That is to say, communication data from the application program 21 are encrypted in the cryptographic processing unit selected by the encryption method selection unit 24. The encrypted data are sent to the workstation 30 via the Internet 19. The data (cipher text or cipher data) received by the workstation 30 are decrypted in the cryptographic processing unit selected by the encryption method selection unit 34, and transferred to the application program 31 in the workstation 30.

Thus, the system shown in FIG. 6 is different from the system shown in FIG. 5 in that the encryption method selection control units 25 and 39 are mutually independent and the encryption methods are sequentially selected. The encryption method selection control units 25 and 39 select new encryption methods at regular or irregular intervals,and send those selection results to the encryption method selection unit 24 and the encryption method selection unit 34, respectively. In this configuration, the encryption method is changing with time, making it hard to decipher the encrypted data.

FIG. 7 shows an example of configuration of a cryptographic processing unit. The following discussion assumes that pseudo random numbers are being used in the encryption method.

Theoretically, as shown for example in FIG. 7A, the cryptographic processing unit consists of an exclusive logical sum generator 40 and a pseudo random number generator 41. The pseudo random number generator 41 may be a variable period type. The encrypted data (cipher text) are obtained by inputting the data to be encrypted (plain text) and pseudo random numbers generated by the pseudo random number generator 41 into the exclusive logical sum generator 40. The configuration is basically the same when the cipher text is decrypted into plain text.

FIG. 7B shows another example of a cryptographic processing unit. In this example, the cryptographic processing unit has, in addition to the exclusive logical sum generator 40 and the pseudo random number generator 41, a seed section 42 that generates seeds for the purpose of generating pseudo random numbers and a seed changing section 43 that outputs instructions to change the seeds that are generated in the seed section 42 at irregular intervals.

In the cryptographic processing unit shown in FIG. 7B, the period of the pseudo random numbers can be changed by providing the seed section 42 and the seed changing section 43, making it hard to decipher the encrypted data. The action by which plain text is encrypted using the exclusive logical sum generator 40 and the pseudo random number generator 41 is the same as in the case shown in FIG. 7A.

Now let us explain the method of changing the period of the pseudo random numbers. In a case in which the pseudo random number generator is realized by a hardware circuit, the period of the pseudo random number generator is determined by, for example, changing the number of stages and the wiring in the linear feedback shift register system that generates the pseudo random numbers.

Figure 8:
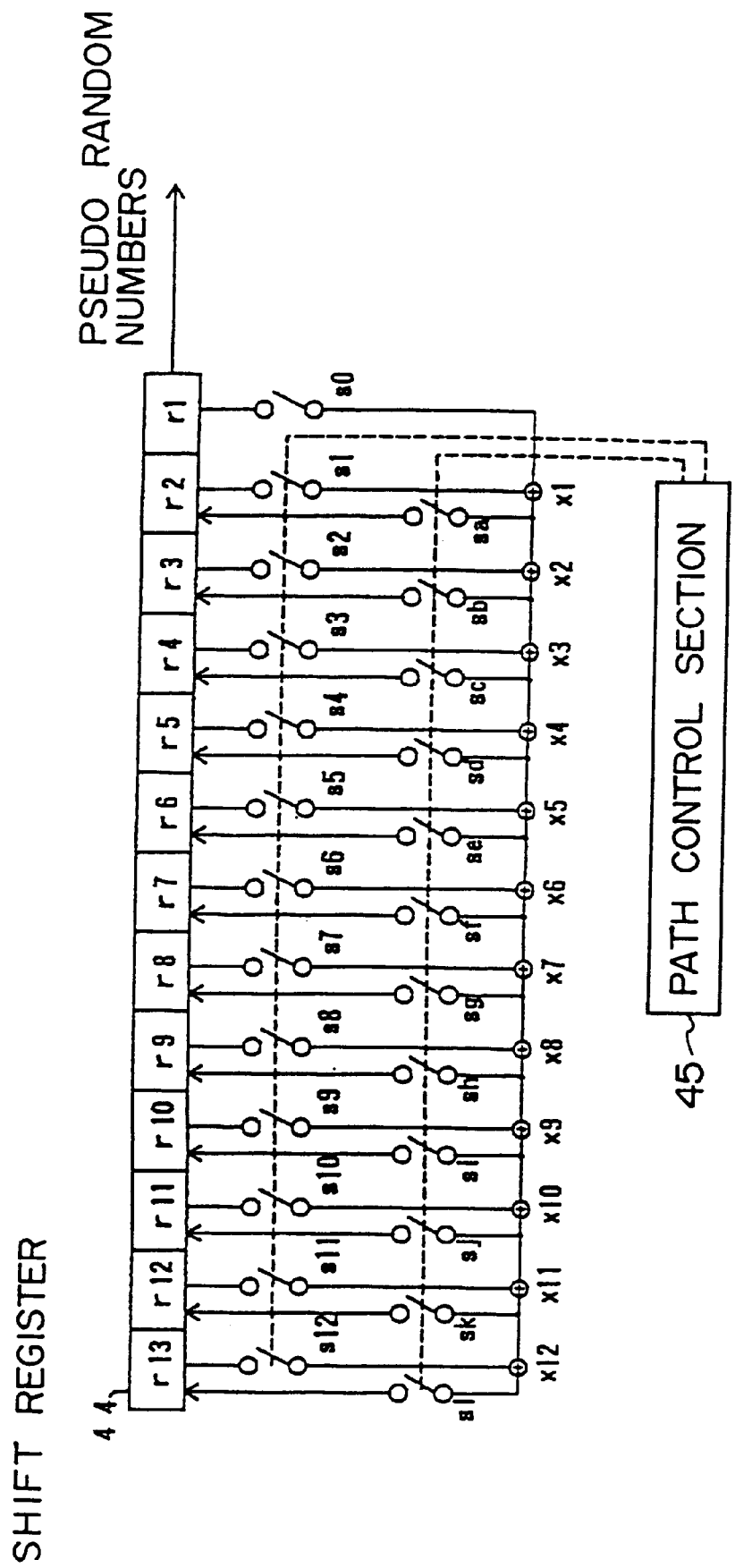
FIG. 8 is a diagram showing the hardware circuit of an embodiment of a pseudo random number generator.

An example of this is shown in FIG. 8. FIG. 8 shows a case in which one embodiment of a pseudo random number generator is realized by a hardware circuit. In FIG. 8, 44 is a shift register, 45 is a path control section, s0 to s12 and sa to sl are switches for path connection, x1 to x12 are exclusive logical sum circuits and r1 to r13 are bit elements of the shift register 44. In the circuit shown in FIG. 8, the signal generated by the path control section 45 is used, and the period of the pseudo random numbers is changed by controlling the feedback of r1 to r13 in the shift register 44, by controlling the connection and disconnection of the paths by means of the switches s0 to s12 and the switches sa to sl.

Figure 9:
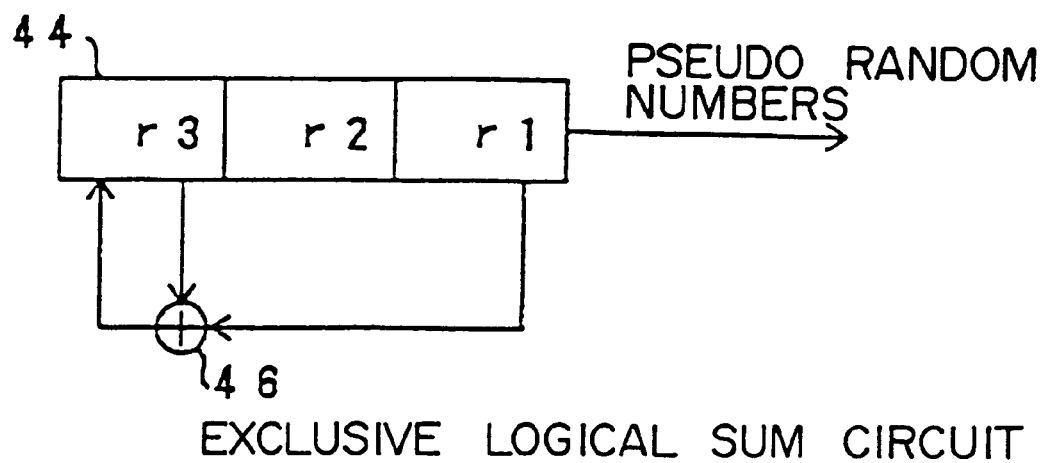
FIG. 9 is a diagram showing the configuration of a 3-stage pseudo random number generator that generates the M series.

Now, let us consider the realization of a pseudo random number generator that generates a 3-stage M series. A primitive polynomial that generates a 3-stage M series is $x^3+x+1$; the hardware configuration is as shown in FIG. 9. In FIG. 9, 44 is a shift register and 46 is an exclusive logical sum circuit. Consequently, in the pseudo random number generator shown in FIG. 8, in order to realize the configuration shown in FIG. 9, the switch s2 and the switch sb are set to ON, and the other switches are set to OFF.

Primitive polynomials that generate an n-stage M series and their periods are given below.

| [number of stages n] | [primitive polynomial] | [period] |
| --- | --- | --- |
| 2 | $x^2 + x + 1$ | 3 |
| 3 | $x^3 + x + 1$ | 7 |
| 4 | $x^4 + x + 1$ | 15 |
| 5 | $x^5 + x^2 + 1$ | 31 |
| 6 | $x^6 + x + 1$ | 63 |
| 7 | $x^7 + x^3 + 1$ | 127 |
| 8 | $x^8 + x^4 + x^3 + x^2 + 1$ | 255 |
| 9 | $x^9 + x^4 + 1$ | 511 |
| 10 | $x^{10} + x^3 + 1$ | 1023 |
| 11 | $x^{11} + x^2 + 1$ | 2047 |
| 12 | $x^{12} + x^6 + x^4 + x + 1$ | 4055 |

For example, in order to realize a 6-stage pseudo random number generator, it is sufficient to feed back the sum of r6 and r1 shown in FIG. 8 to r6, so it is sufficient to set switch s5 and switch se to ON.

Several examples of pseudo random number generators obtained as combinations of pseudo random number generators are shown in FIG. 10.

Figure 10A:
FIGS. 10A to 10C are figures showing an example of a pseudo random number generation method.

In the configuration shown in FIG. 10A, the output of the pseudo random number generator shown in FIG. 8 is used as is as pseudo random numbers. In the configuration shown in FIG. 10B, the 2 outputs of the pseudo random number generator 41a and the pseudo random number generator 41b are input to the exclusive logical sum circuit 47, and the output of that exclusive logical sum circuit 47 is used as the pseudo random numbers. In this case, suppose for example that the initial seeds set in the pseudo random number generator 41a and the pseudo random number generator 41b are different from one another. In the configuration shown in FIG. 10C, the 3 pseudo random number generators 41c, 41d and 41e and the switch 48 are used; the outputs from the 2 pseudo random number generators 41c and 41d are input to the switch 48. The output of the pseudo random number generator 41e is used to control the switch 48 and select the output of either the pseudo random number generator 41c or the pseudo random number generator 41d. Then the output of the switch 48 is used as the pseudo random numbers.

In the trusted agent of this embodiment, there is a software program to realize the action described above, and pseudo random numbers are generated by executing that program.

Figure 10B:
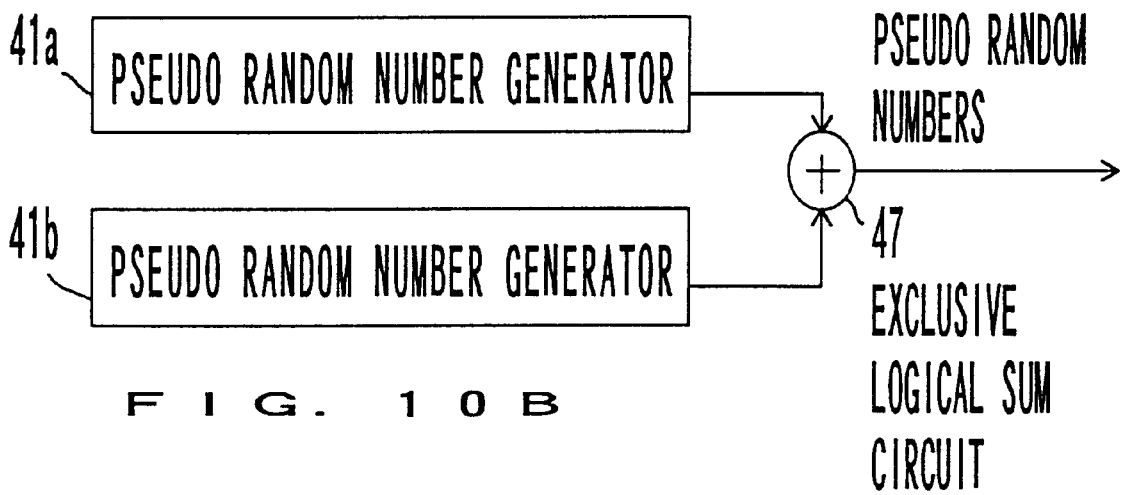
Figure 10C:
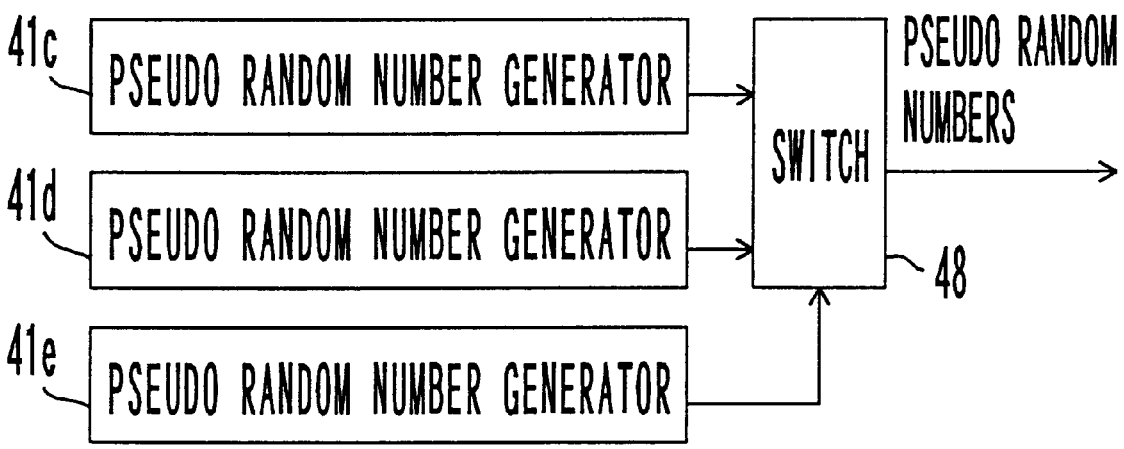

The trusted agents shown in FIG. 5 and FIG. 6 have a plurality of cryptographic processing units; it is possible to, for example, use the random number generation systems shown in FIGS. 10A to 10C as the pseudo random number generation sources in the first, second and third cryptographic processing units, respectively.

FIG. 11 is a flow chart that shows the action of an encryption method selection control unit. Here we explain the action of the encryption method selection control unit 25 in FIG. 5.

In step S1, an initial seed is created based on the time, date, day of the week, etc. shown by the internal clock in the workstation 20. This initial seed is set inside the encryption method selection control unit 25. In step S2, a pseudo random number generator is used to generate pseudo random numbers from the initial seed created in step S1. In step S3, the encryption method is selected based on the pseudo random numbers generated in Step S2. In step S4, information that identifies the encryption method selected in step S3 is transferred to the encryption method selection units 24 and 34.

In step S5, the timing with which the encryption method is switched is determined. This switching timing will be explained in more detail below; it is expressed in terms of a parameter such as number of packets or time. In step S6, whether or not the cryptographic processing sequence has reached the time for changing the encryption method is monitored. When the cryptographic processing sequence reaches the time for switching the encryption method, the pseudo random number that was generated immediately preceding that time is set as the seed in step S7, and then the procedure returns to step S2. After that, steps S2 to S7 are repeated.

By means of the processing described above, the encryption method is selected according to the pseudo random number; the encryption method is then repeatedly switched according to the timing determined by the pseudo random numbers.

The method of selecting the encryption method in step S3 and the method of determining the switching timing in step S5 are, for example, as follows. If 64-bit long type pseudo random numbers are used, the range of values obtained by sampling the pseudo random numbers is $-9.223372035 \times 10^{18}$ to $+9.223372035 \times 10^{18}$. Consequently, in, for example, a case in which there are 10 encryption methods, values from 1 to 10 are obtained from the pseudo random numbers by taking:

selected number=random/$10^{18}$+1

Here "random" is a pseudo random number generated by the pseudo random number generator. If there are 5 encryption methods, then values from 1 to 5 are obtained from the pseudo random numbers by taking:

selected number=(random/$10^{18}$)/2+1

If, for example, the number of packets is used to determine the switching timing, then, in a procedure similar to that used to select the number of the encryption method, number of packets=random/$10^{17}$+1

This gives a value from 1 to 92 based on the pseudo random number.

Supposing, for example, that "3" has been obtained as the selected number of the encryption procedure in step S3, and that "13" has been obtained as the number of packets in step S5. In this case, at the sending side, when 13 packets in which data encrypted using the third cryptographic processing unit are stored have been sent, another cryptographic processing unit number is selected. Then if "2" is obtained as the selected number in step S3, data encrypted using the second cryptographic processing unit are output until the next switching time. Likewise, at the receiving side, when 13 packets in which encrypted data are stored have been deciphered using the third cryptographic processing unit, another cryptographic processing unit number (here, "2") is selected. Then, received packets are deciphered using the second cryptographic processing unit until the next switching time.

In the case of pseudo random numbers, as opposed to true random numbers, once the initial seed and the generation algorithm are determined, the pseudo random numbers that will be obtained from that generation algorithm are uniquely determined. In the configuration shown in FIG. 6, this property of pseudo random numbers is used. That is to say, since the trusted agents 22 and 32 have pseudo random number generators having the same algorithms, as described above, if the same values are set as initial seeds, after that the encryption method will be switched with the same timing in the trusted agents 22 and 32.

As the method of setting the initial seed, after the same value is set in the trusted agents 22 and 32 in the workstation 20, the trusted agent 32 is transferred to the workstation 30. Or, alternatively, the configuration can be such that a command to generate the initial seed is inserted into the trusted agents 22 and 32, and the trusted agents 22 and 32 then generate their initial seeds independently. In this case, if for example the command is one that generates the initial seed in accordance with "today's date" and "the present time", then, as long as the clocks in the workstations 20 and 30 are functioning correctly, identical random numbers will be generated in the trusted agents 22 and 32, and the same encryption methods will be selected.

Figure 12A:
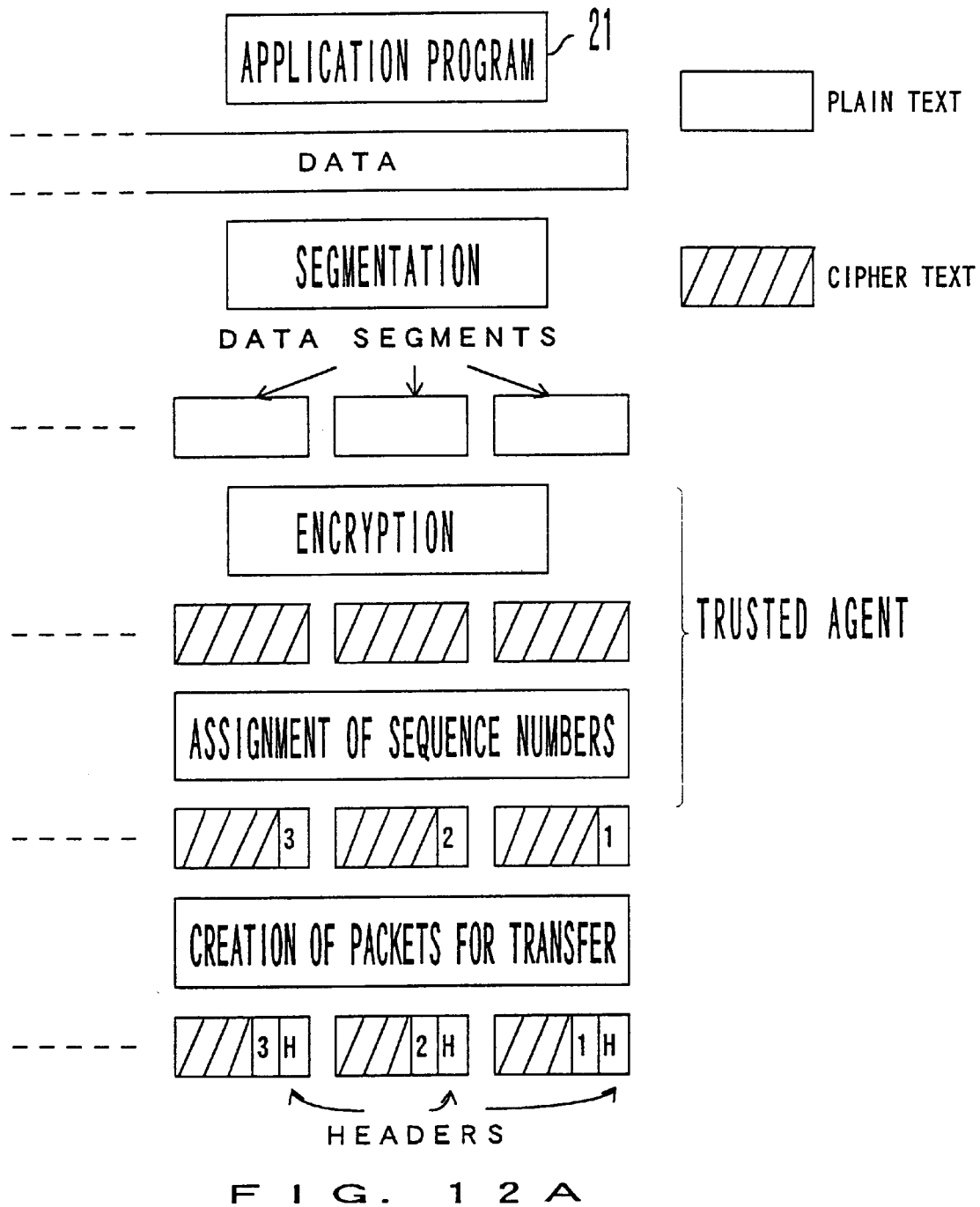
FIG. 12A is a sequence diagram showing the processing on the sending side when data are sent and received between applications.
Figure 12B:
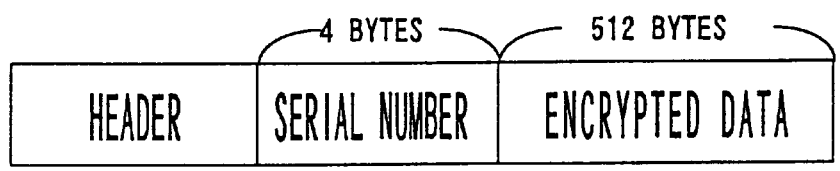
FIG. 12B is a configuration diagram of a data packet that transmits cipher text.
Figure 13:
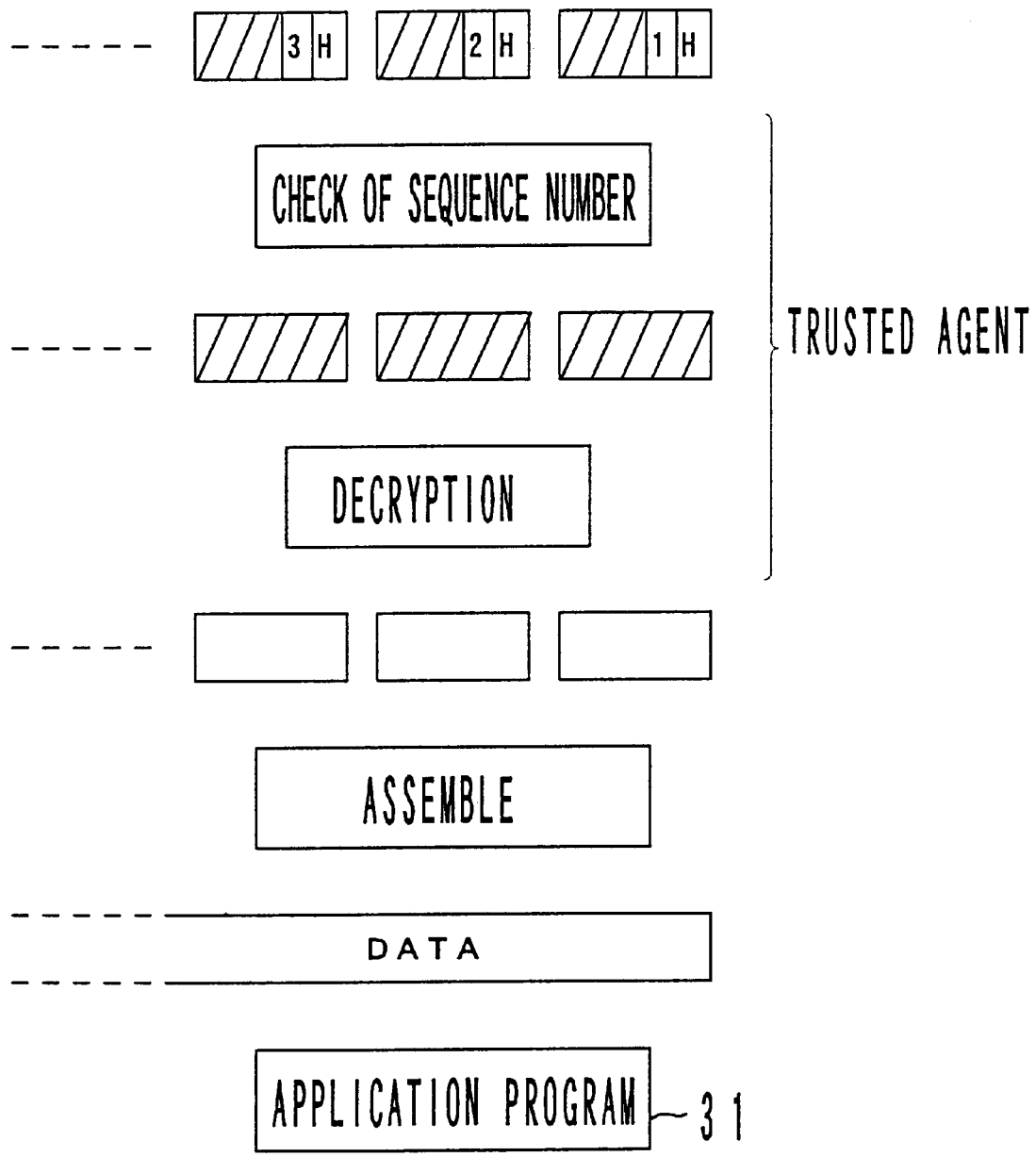
FIG. 13 is a sequence diagram showing the processing on the receiving side when data are sent and received between applications.

Next, let us explain the sequence when data are sent and received between application programs, referring to FIGS. 12 and 13. Here, we consider the case in which data are transmitted from the application program 21 in the workstation 20 to the application program 31 in the workstation 30.

As shown in FIG. 12A, the data from application program 21 are segmented for the purpose of storage in packets. Here, as one example we assume that UDP (User Datagram Protocol) is used as the data transfer protocol. Next, data are encrypted by the specified method, one segment at a time. A sequence number is assigned to each data segment. The sequence numbers are used so that cryptographic synchronization can be established between the sending side and the receiving side even if a packet should be lost. That is to say, the UDP protocol is appropriate when data requiring real time processing such as audio data and video data are transmitted, but since it does not have a resending function, if a packet is lost in transmission it will become impossible to reproduce the data on the receiving side. For this reason, a sequence number is assigned to each data segment, so that the receiving side can detect the loss of packets and reproduce the data correctly.

After that, a header is added and sent to the workstation 30. An example of a packet configuration is shown in FIG. 12B. The sequence numbers and the header are not encrypted.

In the processing described above, the trusted agent 22 does the encryption processing and the processing to assign sequence numbers. It is possible to expand the functions of the trusted agent 22 so that all of the processing shown in FIG. 12A is executed by the trusted agent 22.

When the workstation 30 receives a packet, whether or not a packet has been lost in transmission is judged from its sequence number. If no loss is detected, the encrypted data section is extracted and the data are decrypted. Then the decrypted data are assembled and transferred to the application program 31.

In the processing described above, the trusted agent 32 performs the processing to check the sequence numbers and the decryption processing. It is possible to expand the functions of the trusted agent 32 so that the trusted agent 32 executes all of the processing shown in FIG. 13.

FIG. 14 is a diagram to explain the method of establishing cryptographic synchronization. In encrypted communication using pseudo random numbers, when packets are encrypted using pseudo random numbers on the sending side (the encryption side), it is necessary to use the same pseudo random numbers as the pseudo random numbers used on the sending side when those packets are decrypted on the receiving side (the decryption side). The trusted agents 22 and 32 generate the same pseudo random numbers in the same sequence with the same timing, and execute encryption and decryption processing in their respective sequences. This establishes cryptographic synchronization.

If a packet has been lost in transmission, then, as shown in FIG. 14A, which packet has been lost is detected on the decryption side, and the decryption processing using the pseudo random number corresponding to the packet that was lost is skipped. In the example shown in FIG. 14A, packet 3 has been lost; on the decryption side, random(3) is not used, but instead decryption processing using random(4) is performed with respect to packet 4.

If the order of packets becomes interchanged during transmission, then, as shown in FIG. 14B, after packet 1 is decrypted, if packet 3 is received when packet 2 should be received, the decryption processing using random(2) is skipped. Next, packet 2 is received when packet 3 normally would have been received, so the decryption processing using random(3) is skipped. After that, if packet 4 is received when packet 4 should be received, from this time decryption processing using random(4) is carried out normally.

Thus, the order of received packets is monitored on the decryption side; when loss or interchange of order occurs, synchronization of encryption processing and decryption processing is maintained by skipping decryption processing. This synchronization processing is carried out also in case the first packet is lost.

In the system shown in FIG. 5 or FIG. 6, in order to make it difficult to decipher the encrypted data, the encryption method was changed at regular or irregular intervals. In an encryption method in which use of pseudo random numbers is adopted, it is possible to make the encrypted data difficult to decipher by changing the seed used to generate those pseudo random numbers at regular or irregular intervals.

Figure 15:
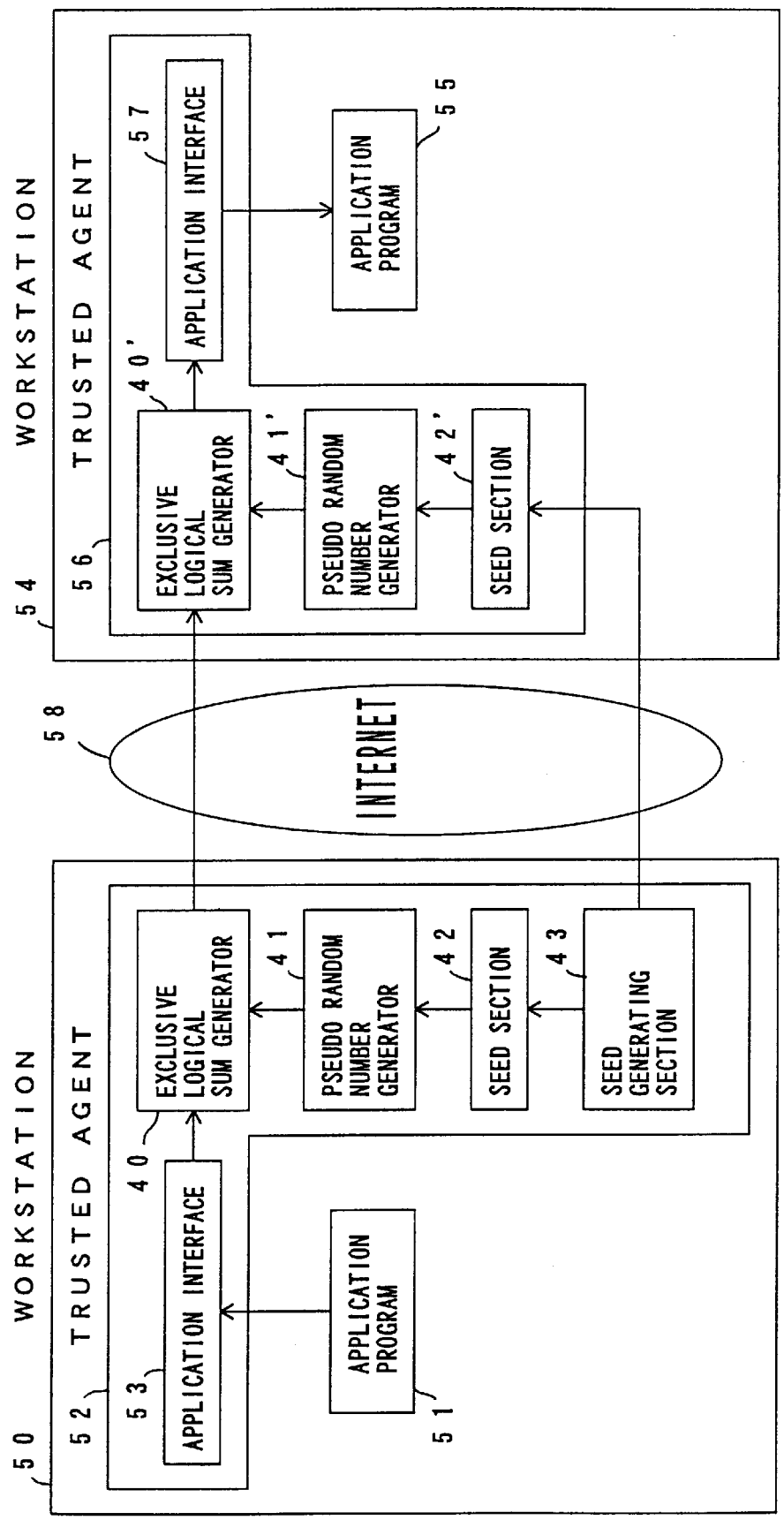
FIG. 15 is a diagram showing an example of configuration of an encrypted communication system that changes the seed for the purpose of generating pseudo random numbers.

FIG. 15 shows an example of the configuration of an encrypted communication system having the capability to change the seed used to generate pseudo random numbers. In FIG. 15, the workstations 50 and 54 correspond to the server 10 and the client 15, respectively, in FIG. 1. The application programs 51 and 55 correspond to the application programs 13 and 16, respectively, in FIG. 1. The trusted agents 52 and 56 correspond to the trusted agents 14 and 17, respectively, in FIG. 1.

The trusted agent 52 has an application interface unit 53, and, as were explained referring to FIG. 7B, an exclusive logical sum generator 40, a pseudo random number generator 41, a seed section 42 and a seed generating section (seed changing section) 43. The trusted agent 56 has an application interface unit 57, and an exclusive logical sum generator 40', a pseudo random number generator 41' and a seed section 42'. The exclusive logical sum generator 40, the pseudo random number generator 41 and the seed section 42, and the exclusive logical sum generator 40', the pseudo random number generator 41' and the seed section 42', are respectively the same type of units.

The action of the encrypted communication system shown in FIG. 15 is as follows. First, the trusted agent 56 that is described in mobile code is transferred from the workstation 50 to the workstation 54. Next, the seed generating section 43 creates 1 seed and transfers that seed to the seed sections 42 and 42', respectively. At this time, a encrypted communication path between the trusted agents 52 and 56 is established.

The seed sections 42 and 42' input the seeds that they have received to the pseudo random number generators 41 and 41', respectively. That is to say, the seeds input to the pseudo random number generators 41 and 41' are the same as one another. The pseudo random number generators 41 and 41' generate pseudo random numbers in accordance with the respective received seeds and input them to the exclusive logical sum generators 40 and 40'. The pseudo random numbers generated in the two units at this time are the same as one another. After that, the seed generating section 43 generates new seeds at regular or irregular intervals in accordance with the specified algorithm and transfers them to the seed sections 42 and 42'. Consequently, the same pseudo random numbers are generated in the trusted agents 52 and 56.

Data from the application program 51 are sent to the exclusive logical sum generator 40 via the application interface unit 53. There the data are encrypted using the pseudo random numbers generated by the pseudo random number generator 41. The encrypted data are sent to the workstation 54 via the Internet 58. The data received by the workstation 54 are decrypted in accordance with the pseudo random numbers generated by the pseudo random number generator 41' in the exclusive logical sum generator 40'. Then those decrypted data are transferred to the application program 55 via the application interface unit 57.

In the encryption/decryption processing described above, the action of generating the pseudo random numbers is mutually synchronized in the trusted agents 52 and 56, so that data encrypted in the trusted agent 52 are decrypted in the trusted agent 56.

Figure 16:
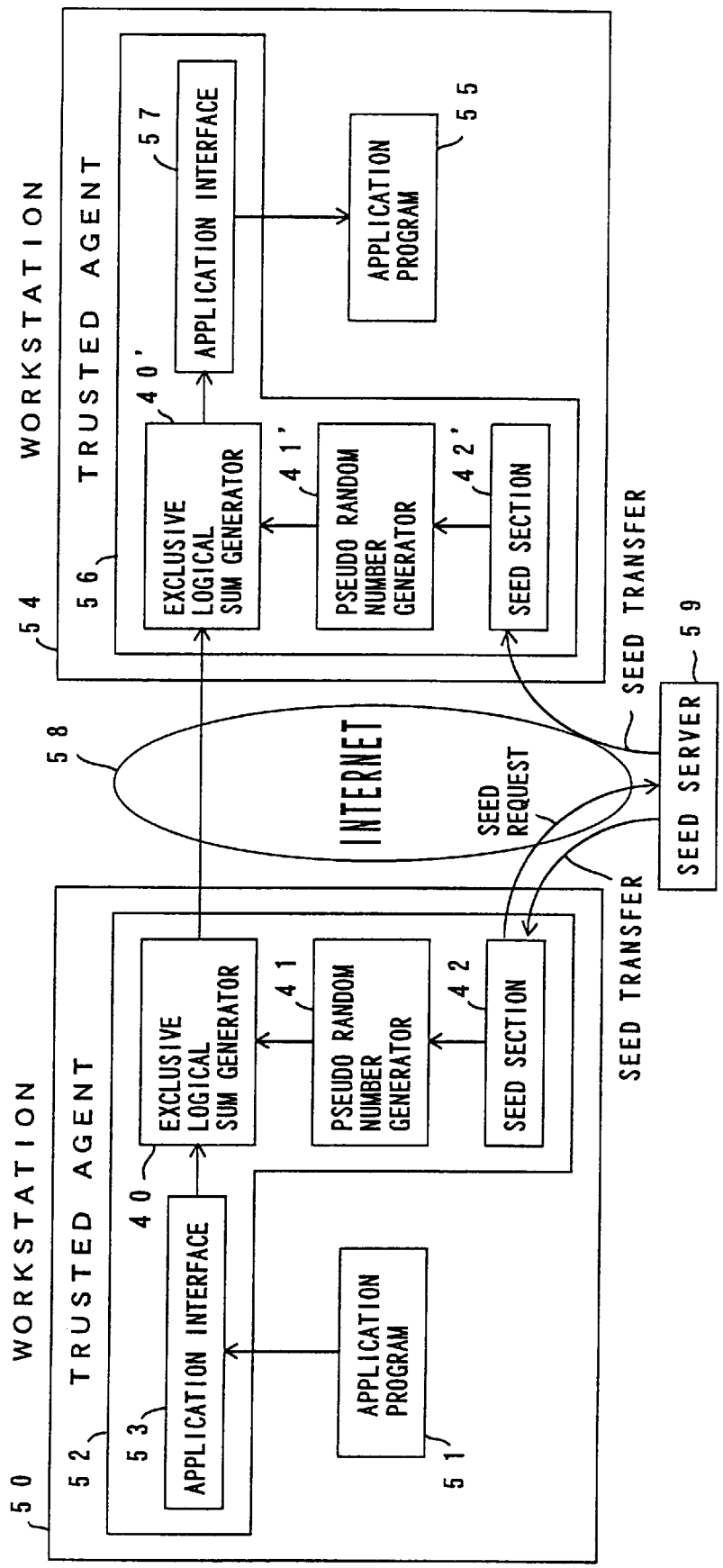
FIG. 16 is a configuration diagram of an encrypted communication system of another embodiment of this invention.

FIG. 16 shows an example of configuration of another embodiment of this invention. In the system shown in FIG. 16, the trusted agent 52 does not have a seed generating section 43; seeds are generated in a seed server 59 connected to the Internet 58. The seed server 59 has functions equivalent to those of the seed generating section 43 in FIG. 15; new seeds are generated at regular or irregular intervals and transferred to the seed sections 42 and 42'.

The action of this system is as follows. First, the trusted agent 56 that is described in mobile code is transferred from the workstation 50 to the workstation 54. Next, the seed section 42 of the workstation 50 requests the seed server 59 for a seed that is needed for encrypted communication. As this time, the trusted agent 52 notify the seed server 59 of the corresponding terminal of the encrypted communication (here, the workstation 54). The seed server 59 generates a seed in accordance with this request, and transfers the generated seed to the seed sections 42 and 42'. This secures an encrypted communication path. The seed server 59 subsequently generates new seeds at regular or irregular intervals and transfers them to the seed sections 42 and 42'. Other action is the same as that described in FIG. 15.

Figure 17:
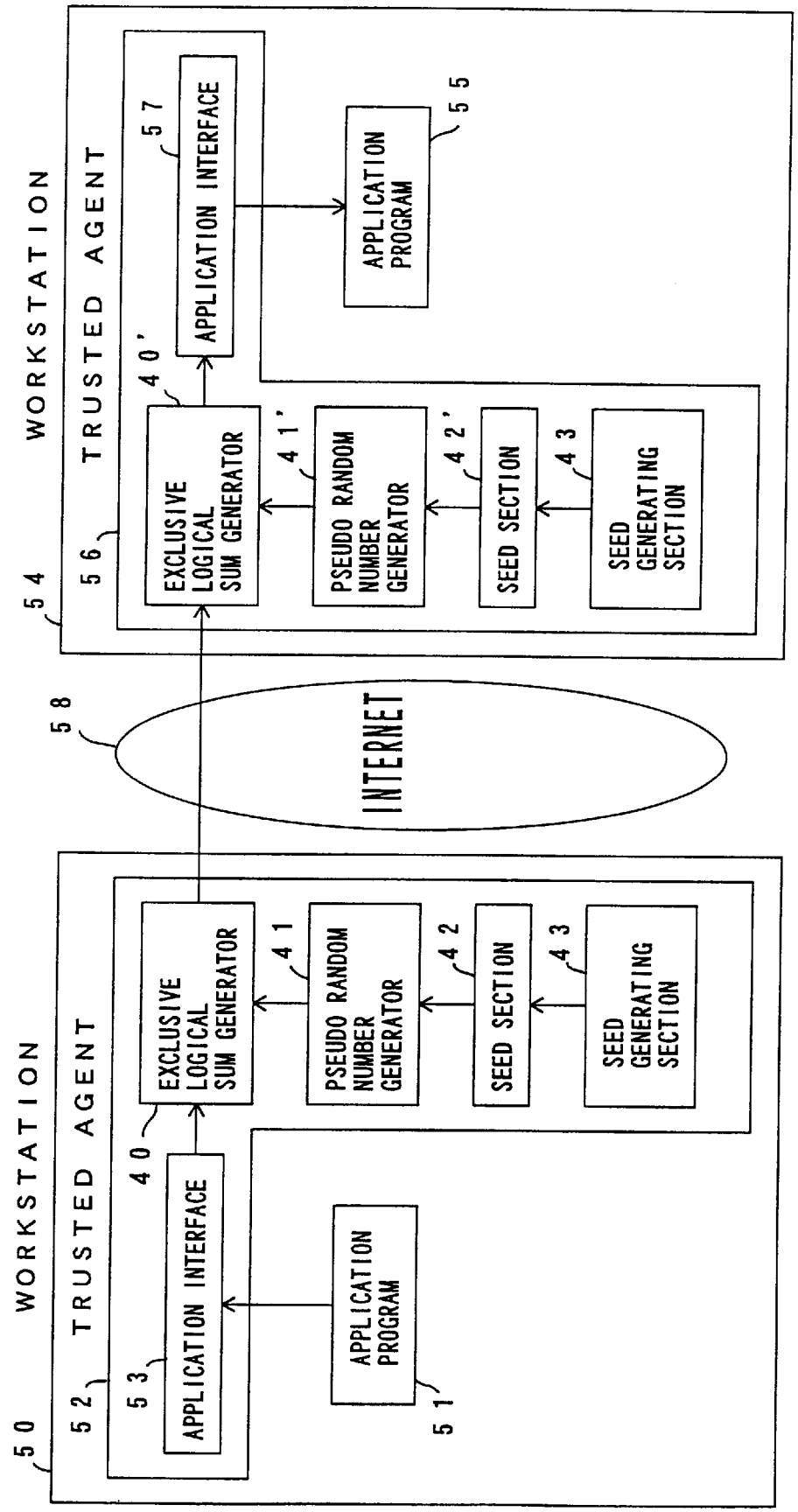
FIG. 17 is a configuration diagram of an encrypted communication system of still another embodiment of this invention.

FIG. 17 shows an example of the configuration of another embodiment of this invention. In the system shown in FIG. 17, the trusted agents 52 and 56 have the seed generating sections 43 and 43', respectively.

The seed generating sections 43 and 43' have the same functions as one another. In addition, the actions of the seed generating sections 43 and 43' are synchronized with each other. That is to say, the same initial values are set in the seed generating sections 43 and 43', and subsequently they output the same seeds in sequence. The synchronization between the seed generating sections 43 and 43' is basically the same as the synchronization between the encryption method selection control units 25 and 39 shown in FIG. 6.

The action of the system shown in FIG. 17 is as follows. First, the trusted agent 56 that is described in mobile code is transferred from the workstation 50 to the workstation 54. Next, the seeds generated by the seed generating sections 43 and 43' are transferred to the seed sections 42 and 42', respectively, thus securing an encrypted communication path. At this time, the seed generating sections 43 and 43' output the same seeds in the same order. Other actions are as explained with reference to FIG. 15.

Figure 18:
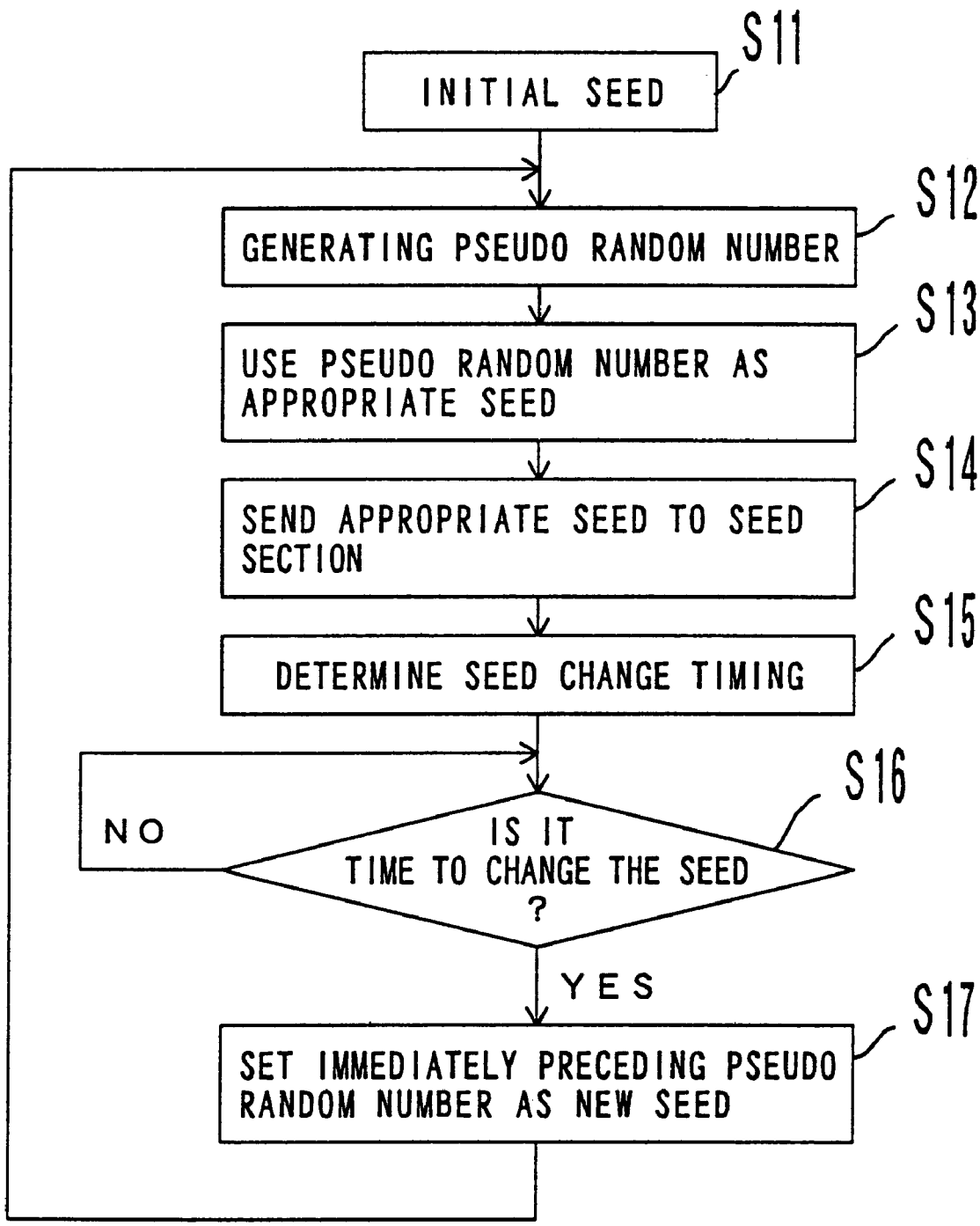
FIG. 18 is a flow chart explaining the action of the seed generating section.

FIG. 18 is a flow chart that explains the action of a seed generating section or seed server. This processing is basically the same as that in the flow chart in FIG. 11, which selects the encryption method.

The initial seed is set in step S11. The method of setting the initial seed is as was explained with reference to FIG. 11. In step S12, pseudo random numbers are generated using the pseudo random number generator based on that initial seed. In steps S13 and S14, the generated random numbers are sent to the seed section as appropriate seeds. In step S15, the timing at which the seed is changed is determined. This change timing is shown by, for example, a parameter such as number of packets or time. In step S16, whether or not the time has reached the seed changing timing is monitored. When the timing to change the seed is reached, in step S17 the immediately preceding generated pseudo random number is set as the new seed, and the procedure returns to step S12. After that, steps S12 to S17 are repeated. The seed is changed at irregular intervals according to the processing described above.

In the system shown in FIG. 15, the seed generating section 43 executes the processing described above. In the system shown in FIG. 16, the seed server 59 executes the processing described above. In the system shown in FIG. 17, the seed generating sections 43 and 43' respectively execute the processing described above. In the system shown in FIG. 17, the exclusive logical sum generator 40, the pseudo random number generator 41 seed section 42, and the seed generating section 43; and the exclusive logical sum generator 40', the pseudo random number generator 41' and seed section 42', and the seed generating section 43' respectively have the same functions as one another, so that by setting the same initial seed in the seed generating sections 43 and 43', the same pseudo random numbers are subsequently generated in the same order.

Figure 19:
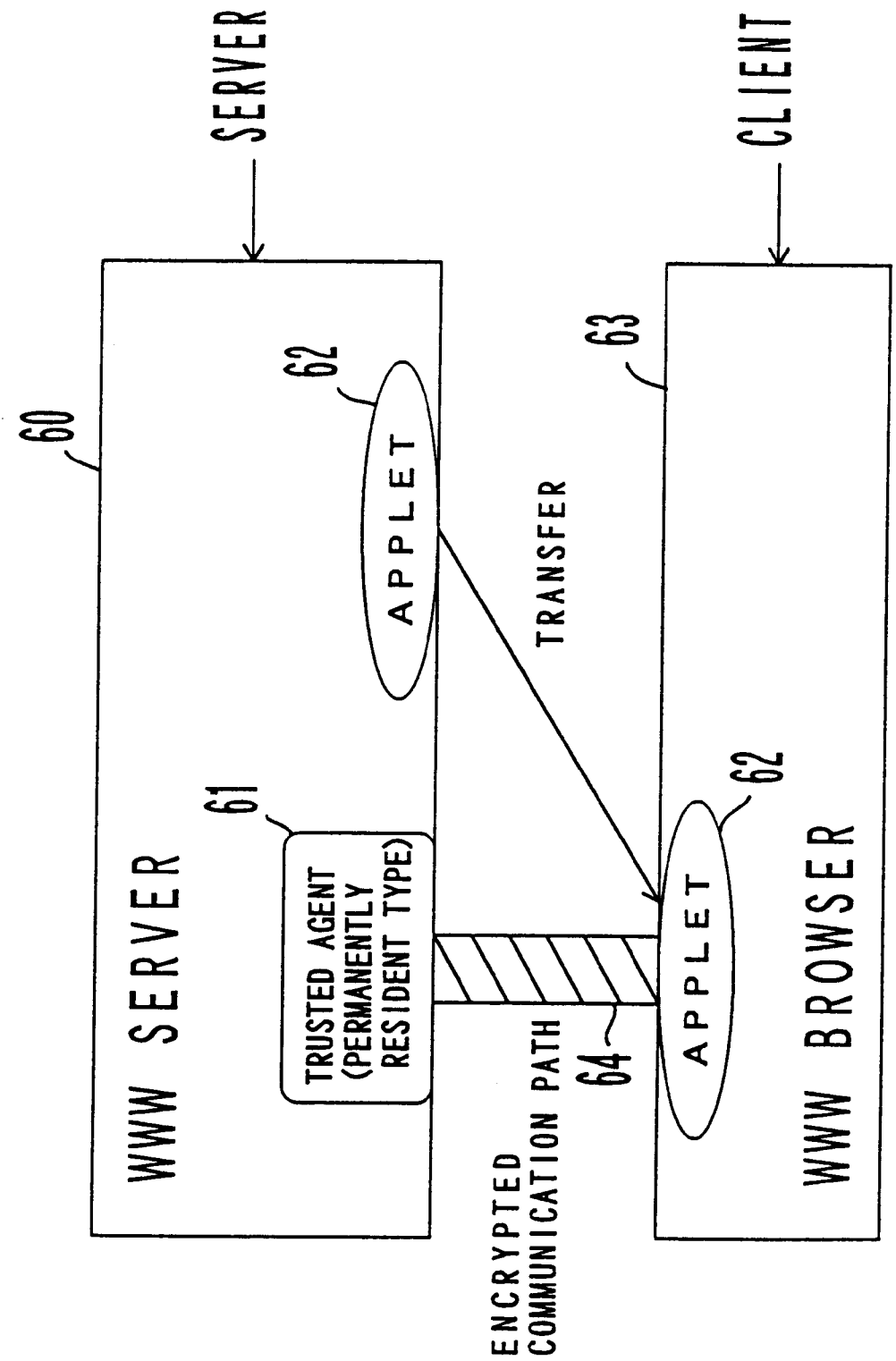
FIG. 19 is a configuration diagram for the case in which the encrypted communication system of this embodiment is matched to the WWW.
Figure 23:
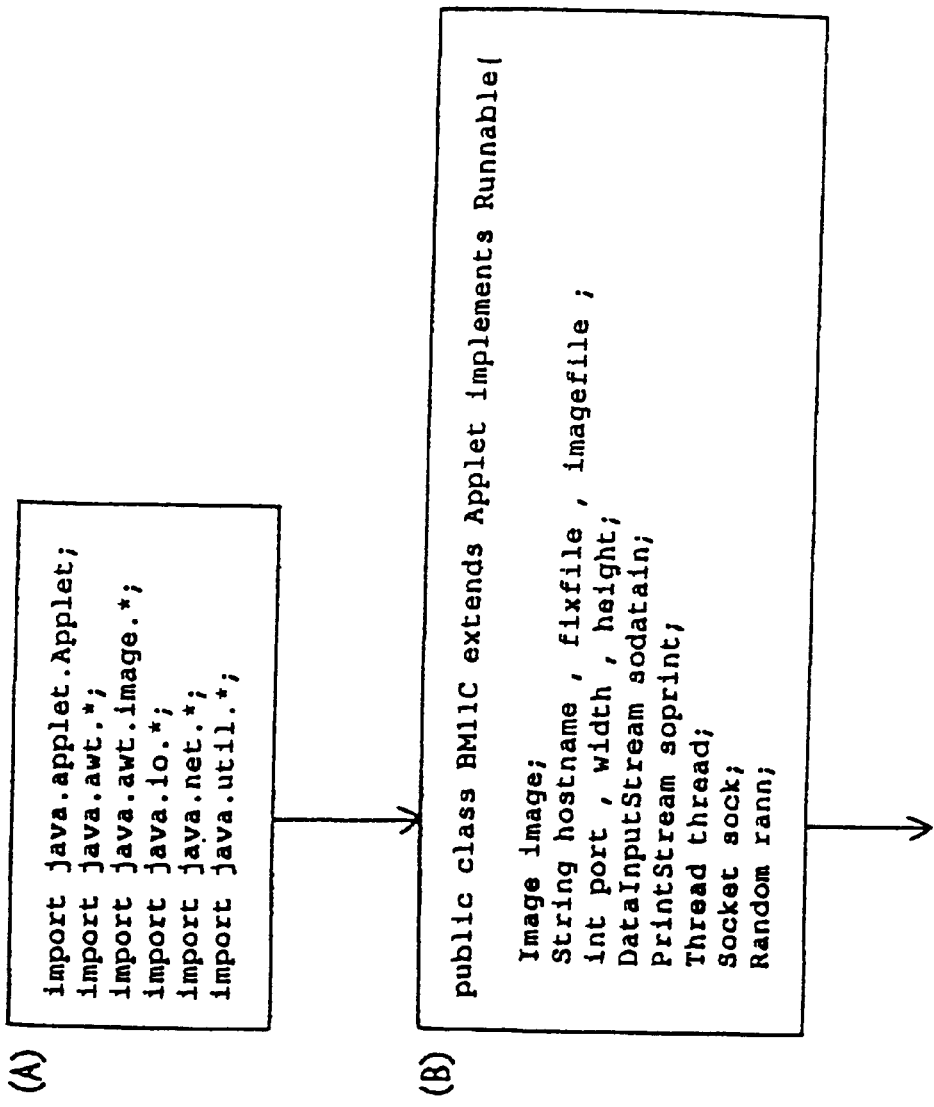
Figure 24:
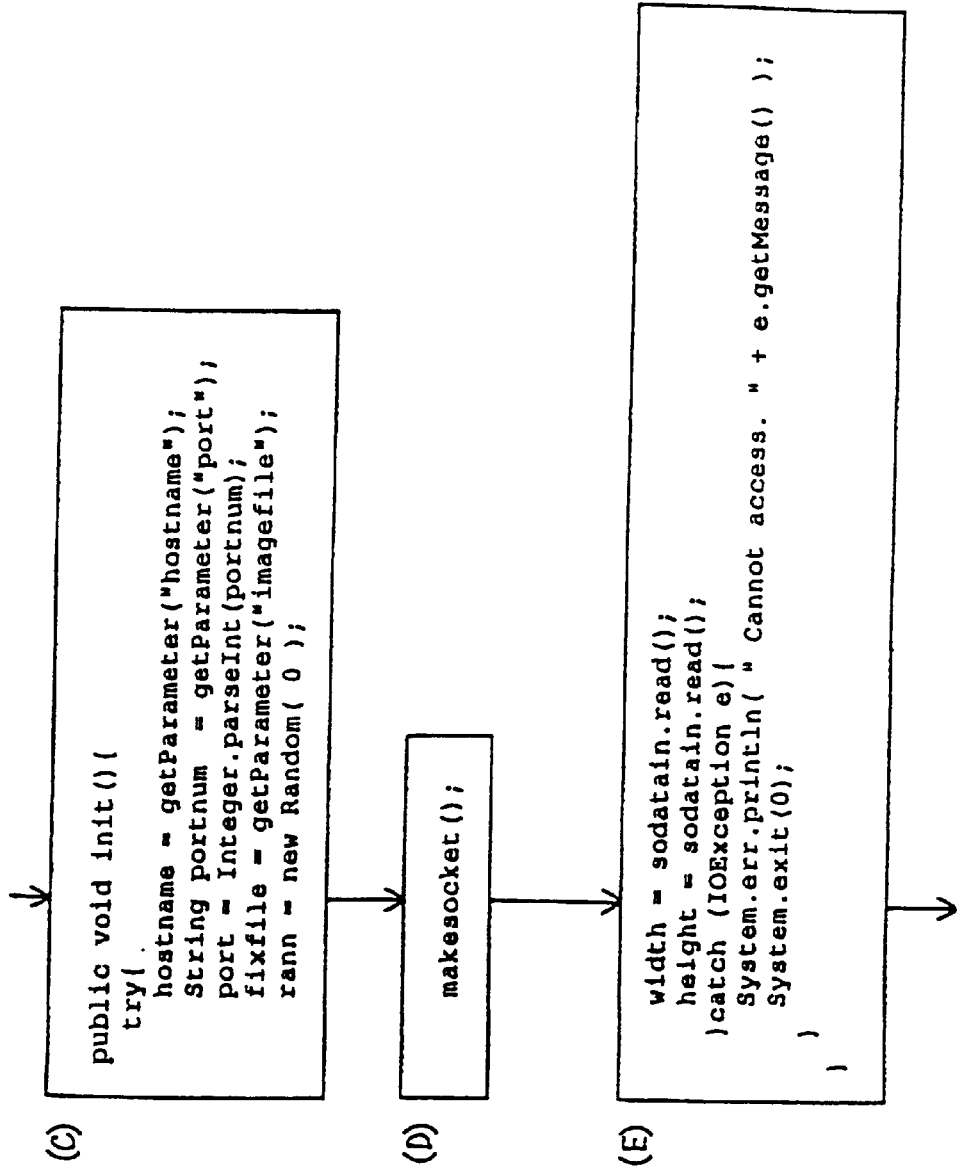
Figure 25:
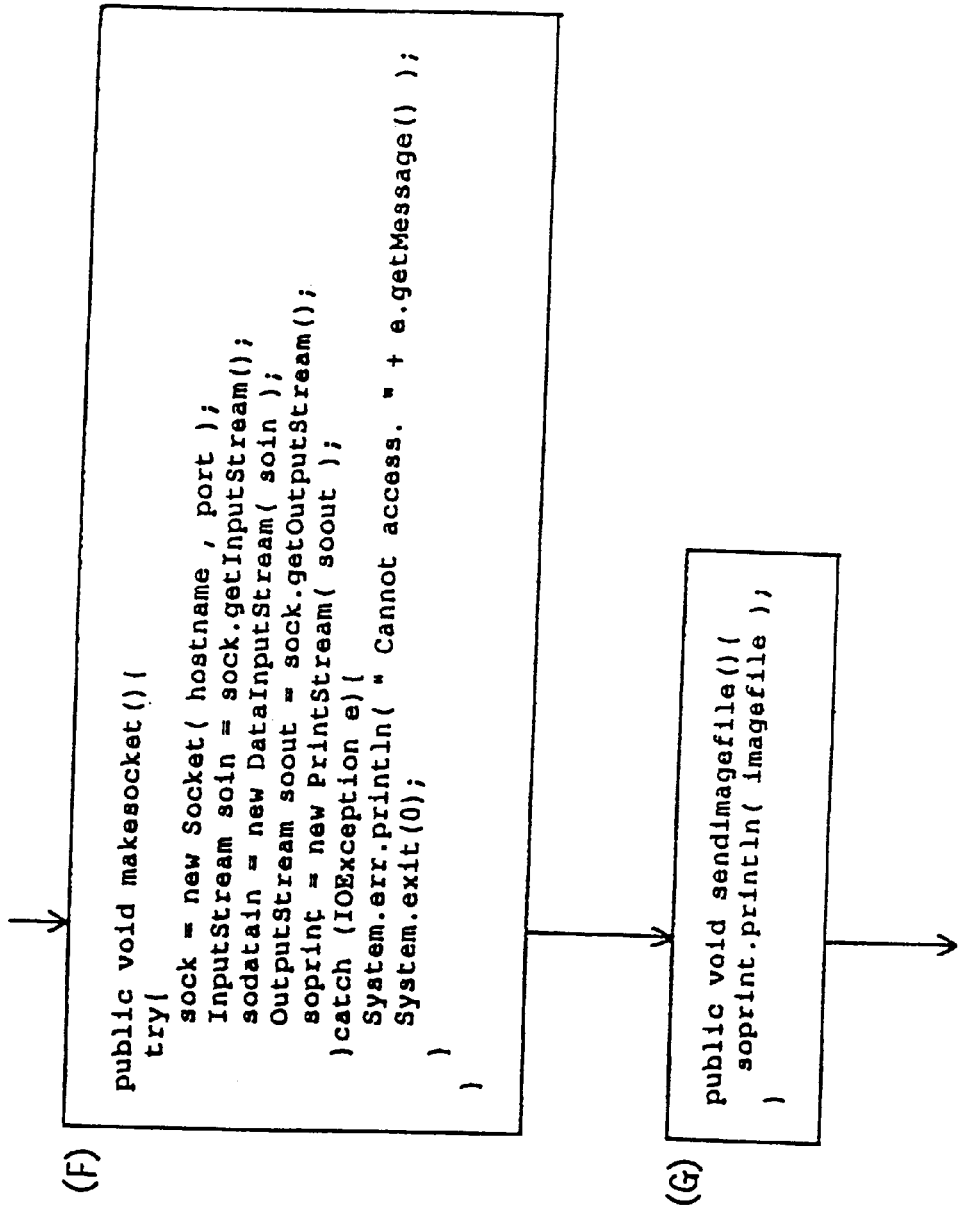
Figure 28:
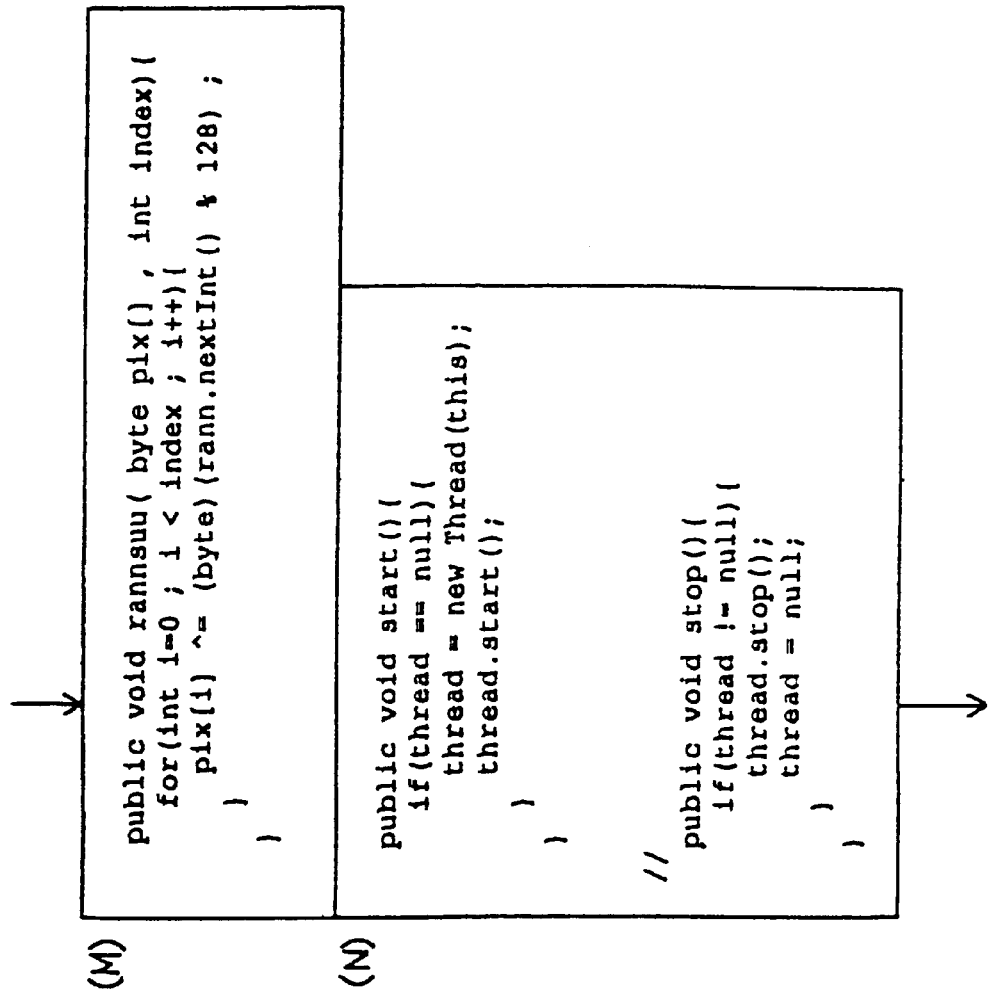

FIG. 19 is a configuration diagram for the case in which the encrypted communication system of this embodiment is matched to the WWW (World Wide Web).

The server side software consists of the WWW server 60, the permanently resident trusted agent 61, and the Applet 62 into which cryptographic processing units have been incorporated. The Applet 62 is an agent with cryptographic processing. Meanwhile, the client side software is the WWW browser 63. The trusted agent 61 corresponds to the trusted agent 14 in FIG. 1. The Applet 62 is described in mobile code and corresponds to the trusted agent 11 in FIG. 1.

The action of this system is as follows. First, in the client side WWW browser 63, access to the WWW server 60 is performed; then the Applet 62 into which the cryptographic processing units are incorporated are transferred from the server side to the client side and that Applet 62 is incorporated into the WWW browser 63. The procedure by which an encrypted communication path is established between the trusted agent 61 and the Applet 62 is, for example, as shown in FIG. 4.

When the desired data are requested from the WWW server 60 by the WWW browser 63, the data sent from the WWW server 60 in response to that request are encrypted by the trusted agent 61, and sent to the client side. On the client side, the cipher text that has been transferred via the encrypted communication path 64 is received by the Applet 62. The Applet 62 knows a method to decrypt the data that were encrypted by the trusted agent 61. The Applet 62 decrypts the cipher text received from the WWW server 60, and transfers those decrypted data to the browsing software of WWW browser 63.

Thus, data transmitted from the WWW server 60 to the WWW browser 63 are encrypted by the trusted agent 61 before being sent, and then are decrypted and reproduced by the Applet 62.

FIG. 20 shows an example of the configuration in the case in which the encrypted communication of this invention corresponds to a video transmission system or an audio transmission system. In this example, a trusted agent into which the cryptographic processing units are incorporated (a trusted agent with cryptographic processing) is used in combination with applications for video transmission and audio transmission.

The workstation 70 from which the audio data and the video data are sent consists of the camera 71, the analogue/digital (A/D) converter 72, the frame buffer 73, the microphone 74, the analogue/digital (A/D) converter 75, the buffer 76 and the permanently resident type trusted agent 77 that has a video data/audio data encryption function. In addition, it has the trusted agent 78 in which the decryption function corresponding to the encryption processing in the trusted agent 77 is described in mobile code.

The workstation 80 that receives the video data/audio data consists of the trusted agent 78, into which cryptographic processing units are incorporated, sent from the sending side workstation 70; the frame buffer 82; the digital/analogue (D/A) converter 83; the display 84; the audio data reception buffer 85; the digital/analogue (D/A) converter 86 and the speaker 87.

The action in this system when video data are sent and received is as follows. First, a request to send the trusted agent 78 is sent from the workstation 80 that wants to receive the video data to the sending side workstation 70. When the sending side workstation 70 receives this send request, it sends the trusted agent 78 that is needed when image data are decrypted to the receiving side workstation 80. This completes the preparation for data transfer.

The sending side workstation 70 converts the image data taken in from the camera 71 into a digital signal by means of the analogue/digital converter 72 and sends it to the frame buffer 73. The frame buffer 73 stores the data from the analogue/digital converter 72 to absorb the difference between the rate at which data are input from the camera 71 and the encryption processing rate in the trusted agent 77.

Next, the output data from the frame buffer 73 are encrypted by the trusted agent 77 and sent out to the network. In the receiving side workstation 80, the encrypted image data that were sent are received and decrypted by the trusted agent 78. The decrypted image data are reconverted to an analogue signal by the digital/analogue converter 83 via the receiving side frame buffer 82 and displayed on the display 84.

In the system shown in FIG. 20, the action in the case of transmission of audio data is almost the same as that described above. That is to say, the real time data that are transferred are audio data rather than video data, the microphone 74 replaces the camera 71 as the input section for the data to be transferred, and the speaker 87 replaces the display 84 as the output section. Otherwise the action is basically the same.

FIG. 21 is a configuration diagram for the case in which the encrypted communication of this invention is used in an electronic conferencing system. In the electronic conferencing system of this embodiment, an agent distributing station 90 and a plurality of hosts 91 to 94 are mutually interconnected via a network 95. The agent distributing station 90 has a user recognition function and distributes agents in response to requests from official users. The network 95 is, for example, a LAN. The multicast communication path 96 is a transmission path for sending and receiving data among the hosts 91 to 94 during an electronic conference. The multicast communication path 96 can be established within the network 95, or it can be established on other physical lines separate from the network 95.

A host that participates in an electronic conference requests the agent distributing station 90 to send an agent that is needed for encrypted communication in order to establish an encrypted communication path. That is to say if, for example, the hosts 91 to 94 are participating in an electronic conference, one among those hosts posts a member that is participating in the electronic conference to the agent distributing station 90. The agent distributing station 90 then sends a trusted agent in which cryptographic processing units are incorporated to the host that made the request. The trusted agents 97 that are distributed to the respective hosts 91 to 94 secure encrypted communication paths among those hosts using the multicast communication path 96. Subsequently, data relating to the electronic conference are sent and received in encrypted form.

The agent distributing station 90 can be configured so that it also serves the function(s) of the encryption method instruction server and/or the encryption processing unit distribution server described with reference to FIG. 5, or for example the seed server 59 shown in FIG. 16.

Next, let us explain the interface between the trusted agent and the application. Here, as shown in FIG. 22A, we envision a case in which data are sent and received between the information processing unit 10 (the server in FIG. 1) and the information processing unit 15 (the client in FIG. 1). In this case, among the settings of the application program 13 in the information processing unit 10, the information processing unit 15 is specified as the communication partner, and a port through which the application program 16 receives data is specified as the communication port. Similarly, in the settings of the application program 16 of the information processing unit 15, the information processing unit 10 is specified as the communication partner, and a port through which the application program 13 receives data is specified as the communication port.

In order to perform encrypted communication, as shown in FIG. 22B, when the trusted agents 14 and 17 are used, in the settings of the application program 13 the same unit (the information processing unit 10) is specified as the communication partner, and a port through which the trusted agent 14 receives data is specified as the communication port. Similarly, in the settings of the application program 17, the same unit (the information processing unit 15) is specified as the communication partner, and a port through which the trusted agent 17 receives data is specified as the communication port.

Thus, by changing the settings of, for example, the communication ports, data sent and received between the application programs 13 and 16 are transmitted via the trusted agents 14 and 17. That is to say, the data sent and received by the application programs 13 and 16 can be encrypted merely by changing settings such as the communication ports, without changing the application programs 13 and 16 themselves.

The proxy (communication routing port) setting is basically changed the same way as the communication partner and communication port described above. That is to say, if there is a function to set the proxy in an application program, the information processing unit in which that application program is installed and a port through which the trusted agent installed in that information processing unit receives data, are set as the proxy.

The API (Application Interface) provided by the trusted agent is used rather than the API provided by the system. In this case, normally it is necessary to recompile after the source program is changed. For example, if there is no trusted agent, the section in which "open( );" appears, while if there is a trusted agent, the section should be changed "openTrusted( );" is changed, and then the source program is recompiled.

It is also possible for a trusted agent of this embodiment to be realized as a kernel module of the operating system (OS), and to be incorporated into the OS as necessary. For example, in FIG. 22B, it is also possible for the trusted agent 14 to be incorporated at kernel level of the OS that is installed in the information processing unit 10.

As shown in FIG. 3, a trusted agent has an application interface section and a cryptographic processing section. As shown in FIG. 4, the cryptographic processing section consists of a sending section and a receiving section. The sending section has a data encryption function, while the receiving section has a cipher text decryption function. In this embodiment, when a trusted agent that is described in mobile code is sent from the server to the client, it is possible to send only the application interface section and the sending section, or only the application interface section and the receiving section.

One application of encryption and sending of data is broadcast communication, such as VOD (Video on Demand). In broadcast communication, the receiving side unit does not need to have a function to encrypt data as a code processing function; it only needs to have a function to decrypt the cipher text that is sent. Consequently, in this case, when a trusted agent is sent to the broadcast communication receiving unit, only the application interface section and the receiving section are sent.

An example of a program of a trusted agent described in mobile code is shown in FIG. 23 to FIG. 29. This program corresponds to the trusted agent 11 in FIG. 1, and is transferred to the client. This program includes a function to execute the cryptographic processing of image data.

This program is for the purpose of reading files in from a WWW (World Wide Web) server and displaying animated images. It is described in Java (an object-oriented language for Internet use developed by Sun Microsystems). This program also has a function to read bitmap-format image information (T0 to T9.ppm) in from a server 2,048 bytes (b[ ]) at a time and perform applet displays. This program displays 10 image files one after another and then repeats the action. An outline of the display method is as follows. First, a communication path to and from the server is established, and the necessary image files are requested. Next, that communication path is used to receive image files, and images are displayed. Let us now give a more detailed explanation about the program referring to the drawings.

(A) First, the class path is defined.

(B) The variables to be used are determined.

(C) The init function is a function that performs initial settings for the purpose of initiating communication with the server. The name of the server that is connected, the server port number and necessary file names are specified. In addition, the pseudo random number generation specifications are determined.

(D) The makesocket function is used to send a connection request to the server and create a communication path.

(E) The communication path that was created is used to obtain information concerning the image width and height from the server. This information is needed when images are reproduced on the client side.

(F) As makesocket function processing, a connection request is sent to the server and processing to set up a communication path is described.

(G) The sendimagefile function is a function that uses the communication path to send the necessary image file names to the server.

(H) The getimage function is a function that uses the communication path to receive image files from the server and create images.

(I) when there are no more data in the image files, processing ends.

(J) Image data are decrypted 1 byte at a time.

(K) One pixel is created every 4 bytes. One pixel has 4 components: brightness, red, green and blue.

(L) Images are made up of pixels.

(M) Encryption is prescribed.

(N) When the program starts up, this program is executed as a thread. By executing as a thread, it becomes possible to execute a plurality of processings in parallel within one program.

(O) The thread action is prescribed. After a communication path is created by the init function, the following substantive processing is actually executed.

(P) Processing to display 10 image files is performed; then this is repeated.

(Q) The communication path is used to send the necessary image file names to the server. The sendimagefile function is used for this processing.

(R) The communication path is used to receive image files from the server and create images. The getimage function is used.

(S) The created images are displayed.

As explained above, this invention makes encrypted communication possible by sending an agent that incorporates cryptographic processing units to the communication partner with which encrypted communication is to be carried out, or by receiving an agent that incorporates cryptographic processing units from that partner. For this reason, it is possible to avoid publicizing the encryption method; and, by using agents, the encryption method can be changed at regular or irregular intervals and the parameters needed in encryption can be changed to make it difficult to decipher the encrypted data. Consequently, a strong encryption method is obtained, having a light overhead that is suitable for real time communication.

This invention is not limited to a cryptosystem but can be widely applied to encode/decode (modulation/demodulation) systems. In this case, an agent including a program for encode/decode (modulation/demodulation) processing described in mobile code is transmitted prior to data transmission.

What is claimed is:

1. An encryption communication method for transmitting encrypted data between a first terminal and a second terminal, comprising:

transmitting, from the first terminal in which a first agent is installed, the first agent including a program for cryptographic processing, a second agent having a function identical to a function of the first agent, to the second terminal;

performing encrypted communication between the first agent and the second agent; and independently and synchronously changing a parameter needed for the encrypted communication between the first and second agents while the encrypted communication is being performed.

2. An encryption communication method for transmitting encrypted data between first and second terminals, comprising:

transmitting to the second terminal from the first terminal in which a first agent is installed, a second agent, the first and second agents each having identical functions and each including a plurality of cryptographic processing units;

performing encrypted communication between the first and second agents; and synchronously changing the cryptographic processing units to be used between the first and second agents while the encrypted communication is being performed.

3. An encryption communication method for transmitting encrypted data between a first terminal and a second terminal, comprising:

transmitting to the second terminal from the first terminal in which a first agent is installed, a second agent, each of the first and second agents including a plurality of cryptographic processing units;

performing encrypted communication between the first and second agents;

instructing which cryptographic processing unit is to be used from an encryption method selection server to each of the first and second agents; and synchronously changing at each of the first and second agents the cryptographic processing units to be used in accordance with said instructing by the encryption method selection server.

4. An encryption communication method for transmitting encrypted data between a first terminal and a second terminal, comprising:

transmitting to the second terminal from the first terminal in which a first agent is installed, a second agent, each of the first and second agents having an identical function for determining the cryptographic processing unit to be used;

setting an identical initial value in each of the first and second agents;

determining a cryptographic processing unit to be used according to the initial value at each of the first and second agents;

performing encrypted communication between the first and second agents; and changing the cryptographic processing units according to said determining at each of the first and second agents.

5. The encryption communication method according to claim 1, wherein the programs for cryptographic processing included in the first and second agents use a pseudo random number.

6. The encryption communication method according to claim 5, further comprising the steps of:

creating a seed for the pseudo random number in the first terminal;

setting the seed in the first and second agents;

generating the pseudo random number in accordance with the seed set in each of the first and second agents; and executing the cryptographic processing using the pseudo random number generated in each of the first and second agents.

7. The encryption communication method according to claim 6, further comprising the step of changing the cryptographic processing at regular or irregular intervals.

8. The encryption communication method according to claim 5, wherein a seed server which generates a seed for the pseudo random number is provided, and wherein said method further comprises the steps of:

generating a seed for the pseudo random number in the seed server;

setting the seed in the first and second agents;

generating the pseudo random number in accordance with the set seed set in each of the first and second agents; and executing the cryptographic processing using the pseudo random number generated in each of the first and second agents.

9. The encryption communication method according to claim 2, wherein each of the first and second agents has a function for creating a seed for a pseudo random number, the functions being the same as one another, and wherein said method further comprises the steps of:

setting an identical initial value in each of the first and second agents;

creating a seed for a pseudo random number according to the initial value at each of the first and second agents; and generating a pseudo random number in accordance with the seed and executing cryptographic processing using the seed in the first and second agents respectively.

10. An encryption communication method for transmitting encrypted data among a plurality of terminals, comprising:

distributing agents including a program for cryptographic processing from an agent distributing server to the plurality of terminals;

performing encrypted communication between the distributed agents; and independently and synchronously changing a parameter needed for the encrypted communication among distributed agents while the encrypted communication is being performed.

11. An encryption communication method for transmitting encrypted data among a plurality of terminals, comprising:

distributing agents from an agent distributing server to the plurality of terminals, each agent including a plurality of cryptographic processing units;

performing encrypted communication between distributed agents; and independently and synchronously changing a parameter needed for the encrypted communication among the distributed agents while the encrypted communication is being performed.

12. An encryption communication method for transmitting data between a first terminal and a second terminal, comprising:

transmitting an agent including a program for cryptographic processing described in mobile code to the second terminal via a network;

performing encrypted communication between the first terminal in which a program for cryptographic processing is installed and the second terminal using the agent, the program for cryptographic processing in the first and second terminals having an identical function to generate pseudo random numbers; and synchronously changing a parameter needed for the encrypted communication between the first and second terminals according to the pseudo random numbers independently generated at each of the first and second terminals.

13. At least one storage medium storing at least one program that when executed causes at least one computer to perform cryptographic processing between first and second terminals, comprising:

transmitting to the second terminal from the first terminal in which a first agent is installed, a second agent, the first agent including a program for cryptographic processing and the second agent having a function identical to a function of the first agent;

performing encrypted communication between the first and second agents; and independently and synchronously changing a parameter needed for the encrypted communication between the first and second agents while the encrypted communication is being performed.

14. At least one storage medium storing at least one program that when executed causes at least one computer to transmit encrypted data among a plurality of terminals, comprising:

distributing agents including a program for cryptographic processing from an agent distributing server to the plurality of terminals;

performing encrypted communication between distributed agents; and independently and synchronously changing a parameter needed for the encrypted communication among distributed agents while the encrypted communication is being performed.

15. An encryption communication method for transmitting encrypted data between a first terminal and a second terminal, comprising the steps of:

transmitting from the first terminal in which a first agent is installed, a second agent, the first and second agents providing a plurality of cryptographic processing units and having identical functions, including a function for creating a pseudo random number; and performing an encryption communication between the first and second agents using the cryptographic processing units, the cryptographic processing units used by the first and second agents being synchronously changed according to the pseudo random numbers which are independently generated in each of the first and second agents.

16. An encrypted communication method for transmitting encrypted data between a first terminal and a second terminal, comprising:

installing in the first terminal a first agent including a program for cryptographic processing;

transmitting the first agent from the first terminal to the second terminal to form a second agent at the second terminal; and performing encrypted communication between the first and second terminals via the first and second agents while independently and synchronously changing at the first and second terminals an encryption parameter used in the encrypted communication.

17. An encrypted communication method as recited in claim 16, wherein said performing comprises:

encrypting communication between the first and second terminals using an encryption key; and synchronously changing the encryption key independently in the first and second agents according to a predetermined rule.

18. An encrypted communication method as recited in claim 16, wherein said first agent includes a plurality of encryption methods wherein said performing comprises:

synchronously and independently in the first and second agents selecting one of the encryption methods; and encrypting communication between the first and second terminals using the selected encryption method.

* * * * *